United States Patent
Jung et al.

(10) Patent No.: US 10,462,839 B2
(45) Date of Patent: Oct. 29, 2019

(54) METHOD FOR TRANSMITTING SIDELINK TERMINAL INFORMATION OF TERMINAL IN WIRELESS COMMUNICATION SYSTEM AND TERMINAL UTILIZING THE METHOD

(71) Applicant: LG ELECTRONICS INC., Seoul (KR)

(72) Inventors: Sunghoon Jung, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/563,874

(22) PCT Filed: Apr. 8, 2016

(86) PCT No.: PCT/KR2016/003736
§ 371 (c)(1),
(2) Date: Oct. 2, 2017

(87) PCT Pub. No.: WO2016/163825
PCT Pub. Date: Oct. 13, 2016

(65) Prior Publication Data
US 2018/0139798 A1    May 17, 2018

Related U.S. Application Data

(60) Provisional application No. 62/144,343, filed on Apr. 8, 2015, provisional application No. 62/145,479, filed
(Continued)

(51) Int. Cl.
*H04W 76/27*    (2018.01)
*H04W 24/10*    (2009.01)
(Continued)

(52) U.S. Cl.
CPC .......... *H04W 76/27* (2018.02); *H04W 24/10* (2013.01); *H04W 92/18* (2013.01); *H04W 8/005* (2013.01); *H04W 48/20* (2013.01); *H04W 84/042* (2013.01)

(58) Field of Classification Search
CPC .............................. H04W 76/27; H04W 48/20
See application file for complete search history.

(56) References Cited

U.S. PATENT DOCUMENTS 8,982,741 B2 * 3/2015 Sirotkin .................. H04W 4/70
370/280
9,648,550 B2 * 5/2017 Zhao ...................... H04W 48/18
(Continued)

FOREIGN PATENT DOCUMENTS

WO    WO 2013/009130 A2    1/2013
WO    WO-2013009130 A2 *  1/2013  ............ H04W 24/10

OTHER PUBLICATIONS

3GPP TS 36.304 V8.5.0 (Mar. 2009), 3rd Generation Partnership Project; Technical Specification Group Radio Access Network; Evolved Universal Terrestrial Radio Access (E-UTRA); User Equipment (UE) procedures in idle mode (Release 8), pp. 1-30.
(Continued)

*Primary Examiner* — Parth Patel
(74) *Attorney, Agent, or Firm* — Birch, Stewart, Kolasch & Birch, LLP

(57) ABSTRACT

Provided are a method for transmitting sidelink terminal information of a terminal in a wireless communication system and a terminal utilizing the method. The method receives a request for a sidelink system information report from a serving cell located on a first frequency, wherein the sidelink system information report request is a message requesting a report of system information associated with a sidelink action acquired from another cell of a second frequency, and sidelink terminal information, comprising
(Continued)

system information associated with the sidelink action acquired from another cell of the second frequency, is reported to the serving cell.

11 Claims, 22 Drawing Sheets

Related U.S. Application Data on Apr. 9, 2015, provisional application No. 62/251,694, filed on Nov. 6, 2015.

(51) Int. Cl.
*H04W 92/18* (2009.01)
*H04W 48/20* (2009.01)
*H04W 84/04* (2009.01)
*H04W 8/00* (2009.01)

(56) References Cited

U.S. PATENT DOCUMENTS

| | | | | |
|---|---|---|---|---|
| 9,843,919 | B2* | 12/2017 | Fukuta | H04W 76/14 |
| 9,986,470 | B2* | 5/2018 | Son | H04W 36/0055 |
| 2009/0274123 | A1* | 11/2009 | Chang | H04W 24/10 |
| | | | | 370/332 |
| 2013/0028126 | A1* | 1/2013 | Kazmi | H04W 24/10 |
| | | | | 370/252 |
| 2013/0053052 | A1 | 2/2013 | Ke et al. | |
| 2013/0178216 | A1* | 7/2013 | Chang | H04W 24/10 |
| | | | | 455/437 |
| 2013/0229938 | A1* | 9/2013 | Jung | H04J 11/005 |
| | | | | 370/252 |
| 2014/0086173 | A1* | 3/2014 | Sadeghi | H04L 5/005 |
| | | | | 370/329 |
| 2015/0017999 | A1* | 1/2015 | Chen | H04W 16/14 |
| | | | | 455/452.1 |
| 2015/0036517 | A1* | 2/2015 | Ruutu | G01S 5/0036 |
| | | | | 370/252 |
| 2015/0312809 | A1* | 10/2015 | Shu | H04W 36/0022 |
| | | | | 370/331 |
| 2015/0365831 | A1* | 12/2015 | Ko | H04L 5/001 |
| | | | | 370/329 |
| 2016/0262137 | A1* | 9/2016 | Behravan | H04W 36/0088 |
| 2016/0270136 | A1* | 9/2016 | Liu | H04W 76/14 |
| 2016/0316505 | A1* | 10/2016 | Morita | H04W 76/14 |
| 2016/0330781 | A1* | 11/2016 | Kalhan | H04W 72/1278 |
| 2016/0366677 | A1* | 12/2016 | Fujishiro | H04W 76/14 |
| 2017/0339580 | A1* | 11/2017 | Martin | H04W 16/14 |
| 2018/0139798 | A1* | 5/2018 | Jung | H04W 8/00 |

OTHER PUBLICATIONS

3GPP TSG-RAN WG1 Meeting #80, R1-150252, "Inclusion of measurement for ProSe", Athens, Greece, Feb. 9-13, 2013, total of 5 pages.
3GPP TSG RAN WG1 Meeting #80, R1-150901, "Text proposals for sidelink operations", Athens, Greece, Feb. 9-13, 2015, pp. 1-4.

\* cited by examiner

METHOD FOR TRANSMITTING SIDELINK TERMINAL INFORMATION OF TERMINAL IN WIRELESS COMMUNICATION SYSTEM AND TERMINAL UTILIZING THE METHOD

CROSS REFERENCE TO RELATED APPLICATIONS

This application is the National Phase of PCT International Application No. PCT/KR2016/003736, filed on Apr. 8, 2016, which claims priority under 35 U.S.C. 119(e) to U.S. Provisional Application No. 62/144,343, filed on Apr. 8, 2015, U.S. Provisional Application No. 62/145,479, filed on Apr. 9, 2015, and U.S. Provisional Application No. 62/251,694, filed on Nov. 6, 2015, all of which are hereby expressly incorporated by reference into the present application.

BACKGROUND OF THE INVENTION

Field of the Invention

The present invention relates to a wireless communication system, more particularly, a method for transmitting sidelink terminal information of terminal in a wireless communication system and the terminal utilizing the method.

Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

For example, 3rd Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

There is a growing interest in a Device-to-Device (D2D) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The public safety network has higher service requirements (reliability and security) than the commercial communication network. In particular, if coverage of cellular communication is not affected or available, the public safety network also requires direct communication between devices, that is, D2D operation.

D2D operation may have various advantages in that it is communication between devices in proximity. For example, D2D UE has a high transfer rate and a low delay and may perform data communication. Furthermore, in D2D operation, traffic concentrated on a base station can be distributed. If D2D UE plays the role of a relay, it may also play the role of extending coverage of a base station.

In LTE-A, terminal-to-terminal interface is referred to as a sidelink. Actions that a terminal can perform on a sidelink include sidelink communication and sidelink discovery.

In a prior art, it is assumed that the terminal always transmits a sidelink discovery signal only in the serving cell, and a configuration of the sidelink discovery signal is also received only in the serving cell. However, in the future wireless communication system, the terminal may transmit the sidelink discovery signal in the non-serving cell of the non-serving frequency on which the terminal is not subject to the service. That is, the terminal may perform the sidelink action at a frequency other than the serving frequency.

The terminal informs the network of the sidelink information through the sidelink terminal information. In conventional sidelink terminal information, the terminal cannot inform the frequency or cell that the terminal is interested in transmitting the sidelink discovery signal. Thus, it is inefficient to directly apply the conventional sidelink terminal information to future wireless communication systems.

In addition, the network cannot know the frequency or cell in which the terminal is interested in performing the sidelink action, and thus the sidelink action related configuration provided by the cell on the corresponding frequency cannot be known. Accordingly, there is a problem that it is difficult for the network to assist the sidelink action of the terminal.

SUMMARY OF THE INVENTION

It is a technical subject solved by the present invention to provide a method for transmitting sidelink terminal information of a terminal in a wireless communication system and the terminal using the method.

In one aspect, provided is a method for transmitting sidelink terminal information of a terminal in a wireless communication system. The method includes receiving a request for sidelink system information report from a serving cell located on a first frequency, wherein the sidelink system information report request is a message requesting reporting system information associated with a sidelink action acquired from another cell of a second frequency and reporting the sidelink terminal information, comprising system information associated with the sidelink action acquired from another cell of the second frequency to the serving cell.

The first frequency and the second frequency may be different frequencies.

The sidelink action may be a discovery action.

Upon receiving the sidelink system information report request, a timer may be started.

The timer may stop when transmitting the sidelink terminal information.

If the timer expires, the system information associated with the sidelink action may be stopped to acquire from the another cell of the second frequency The sidelink terminal information may include an identity (ID) of a public land mobile network (PLMN) to which the another cell belongs.

The sidelink terminal information may further include a cell ID of the another cell.

The sidelink terminal information may further include information indicating the second frequency.

The sidelink terminal information may include at least one of sidelink reception resource information, sidelink transmission resource information, transmission power configuration information, synchronization information, and cell selection or reselection information.

The system information may be system information block 19 (SIB19), which includes information on the sidelink discovery action.

In another aspect, provided is a terminal. The terminal includes a radio frequency (RF) unit configured to transmit and receive a radio frequency signal and a processor operatively coupled to the RF unit. The processor further configured to: receive a request for sidelink system information report from a serving cell located on a first frequency, wherein the sidelink system information report request is a message requesting reporting system information associated with a sidelink action acquired from another cell of a second frequency and report the sidelink terminal information, comprising system information associated with the sidelink action acquired from another cell of the second frequency to the serving cell.

According to the present invention, a terminal inform a network of a frequency, and a cell, in which the terminal is interested in transmitting the sidelink discovery signal, a PLMN in which the cell is included, a sidelink action related configuration provided by the cell through the system information, and the like through the sidelink terminal information. Accordingly, the network can consider the sidelink action of the terminal during an uplink scheduling for the terminal. Thus, deterioration in performance of the sidelink action of the terminal can be prevented.

DESCRIPTION OF EXEMPLARY EMBODIMENTS

Figure 1:
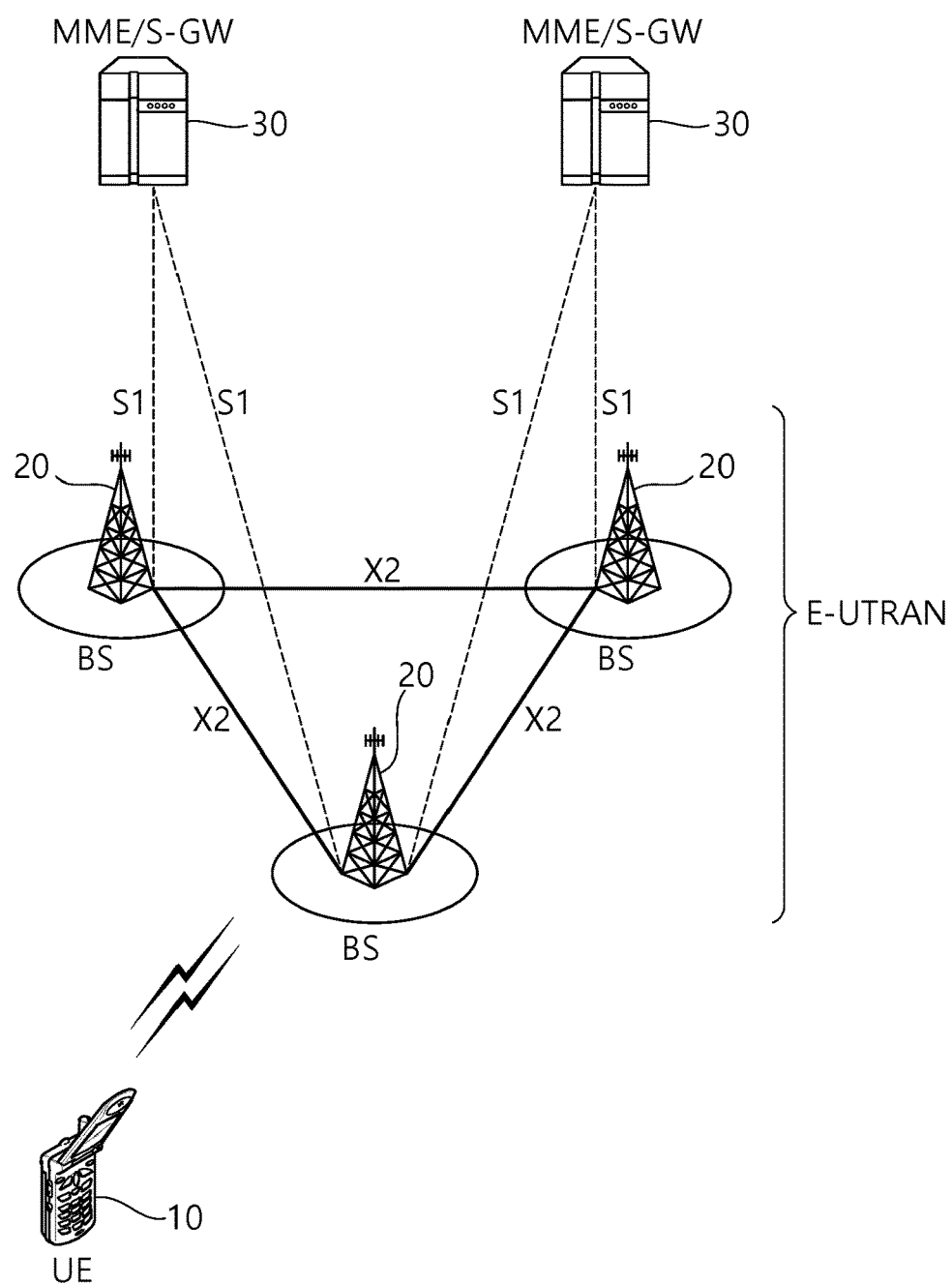
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
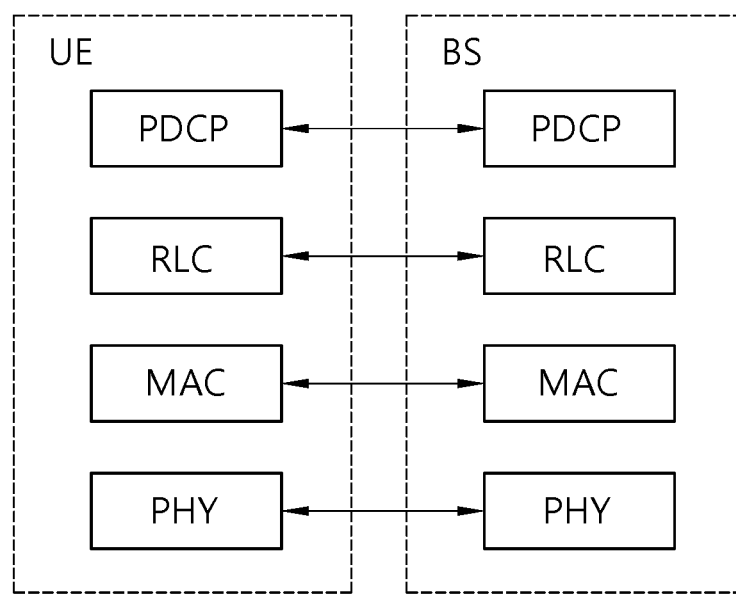
FIG. 2 is a diagram showing a wireless protocol architecture for a user plane.
Figure 3:
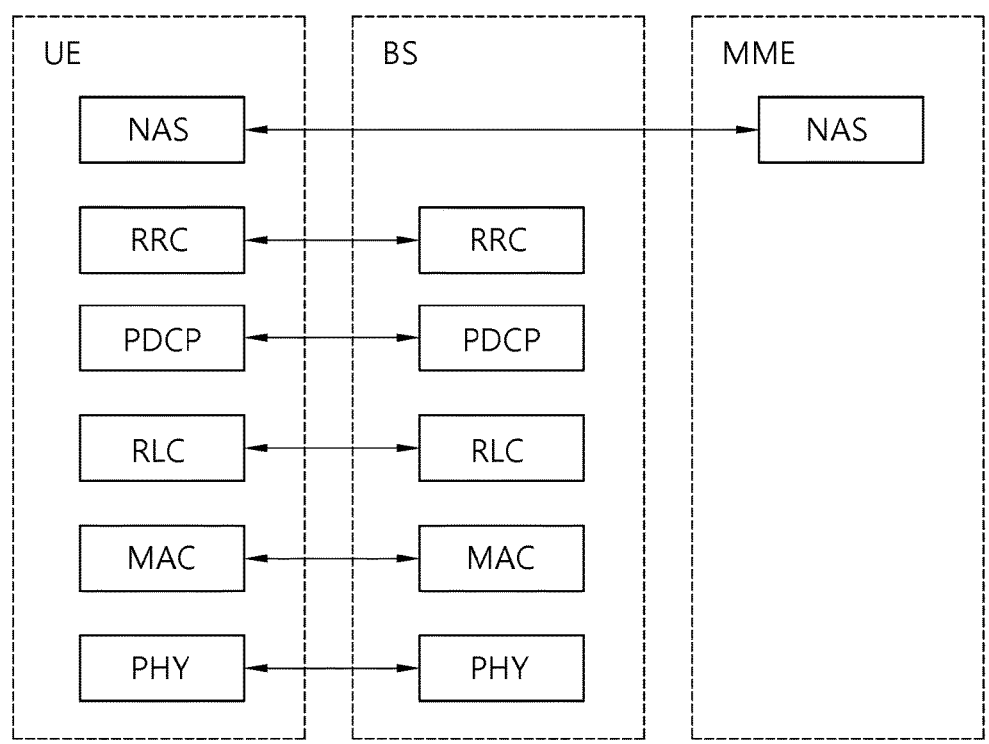
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include the limited number of parameters which are the most essential and are most frequently transmitted in order to obtain other information from a cell. UE first discovers an MIB after downlink synchronization. The MIB may include information, such as a downlink channel bandwidth, a PHICH configuration, an SFN supporting synchronization and operating as a timing reference, and an eNB transmission antenna configuration. The MIB may be broadcasted on a BCH.

SystemInformationBlockType1 (SIB1) of included SIBs is included in a "SystemInformationBlockType1" message and transmitted. Other SIBs other than the SIB1 are included in a system information message and transmitted. The mapping of the SIBs to the system information message may be flexibly configured by a scheduling information list parameter included in the SIB1. In this case, each SIB is included in a single system information message. Only SIBs having the same scheduling required value (e.g. period) may be mapped to the same system information message. Furthermore, SystemInformationBlockType2 (SIB2) is always mapped to a system information message corresponding to the first entry within the system information message list of a scheduling information list. A plurality of system information messages may be transmitted within the same period. The SIB1 and all of the system information messages are transmitted on a DL-SCH.

In addition to broadcast transmission, in the E-UTRAN, the SIB1 may be channel-dedicated signaling including a parameter set to have the same value as an existing set value. In this case, the SIB1 may be included in an RRC connection re-establishment message and transmitted.

The SIB1 includes information related to UE cell access and defines the scheduling of other SIBs. The SIB1 may include information related to the PLMN identifiers, Tracking Area Code (TAC), and cell ID of a network, a cell barring state indicative of whether a cell is a cell on which UE can camp, a required minimum reception level within a cell which is used as a cell reselection reference, and the transmission time and period of other SIBs.

The SIB2 may include radio resource configuration information common to all types of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and for detecting a change of system information to only a PCell. In an SCell, when the corresponding SCell is added, the E-UTRAN may provide all types of system information related to an RRC connection state operation through dedicated signaling. When system information related to a configured SCell is changed, the E-UTRAN may release a considered SCell and add the considered SCell later. This may be performed along with a single RRC connection re-establishment message. The E-UTRAN may set a value broadcast within a considered SCell and other parameter value through dedicated signaling.

UE needs to guarantee the validity of a specific type of system information. Such system information is called required system information. The required system information may be defined as follows.

If UE is in the RRC_IDLE state: the UE needs to have the valid version of the MIB and the SIB1 in addition to the SIB2 to SIB8. This may comply with the support of a considered RAT.

If UE is in the RRC connection state: the UE needs to have the valid version of the MIB, SIB1, and SIB2.

In general, the validity of system information may be guaranteed up to a maximum of 3 hours after being obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
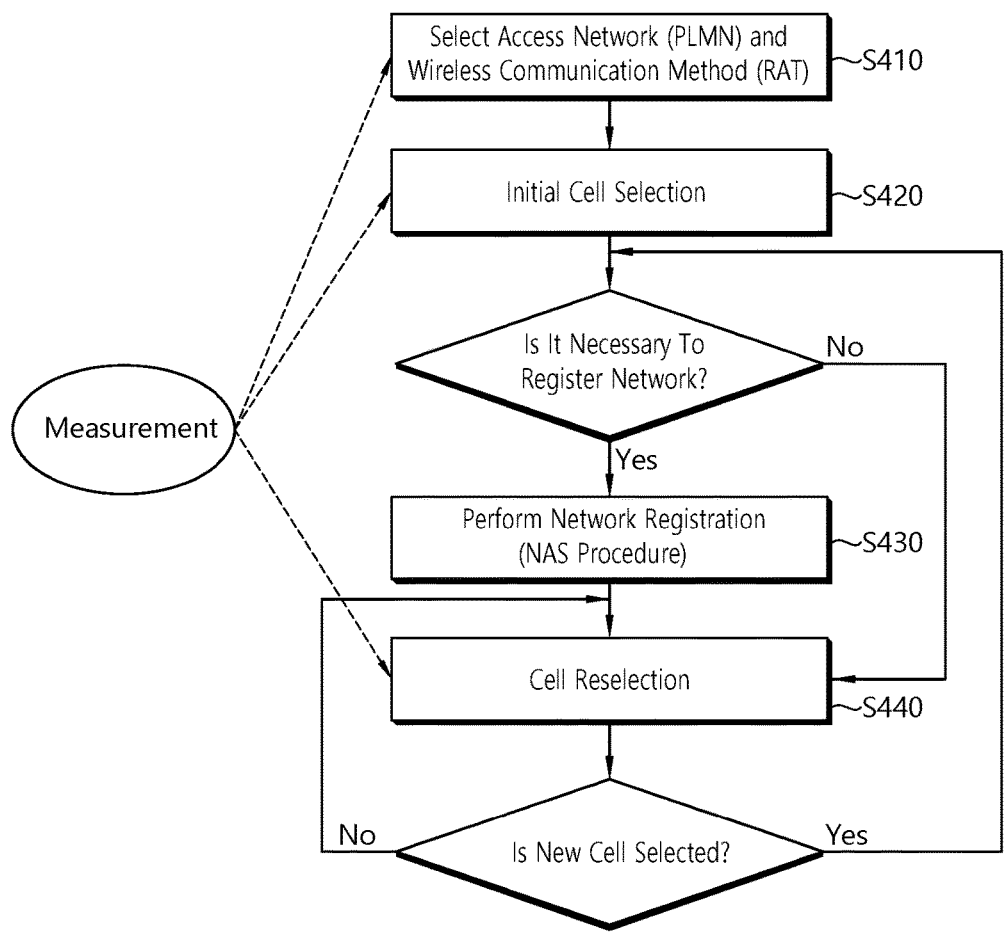
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
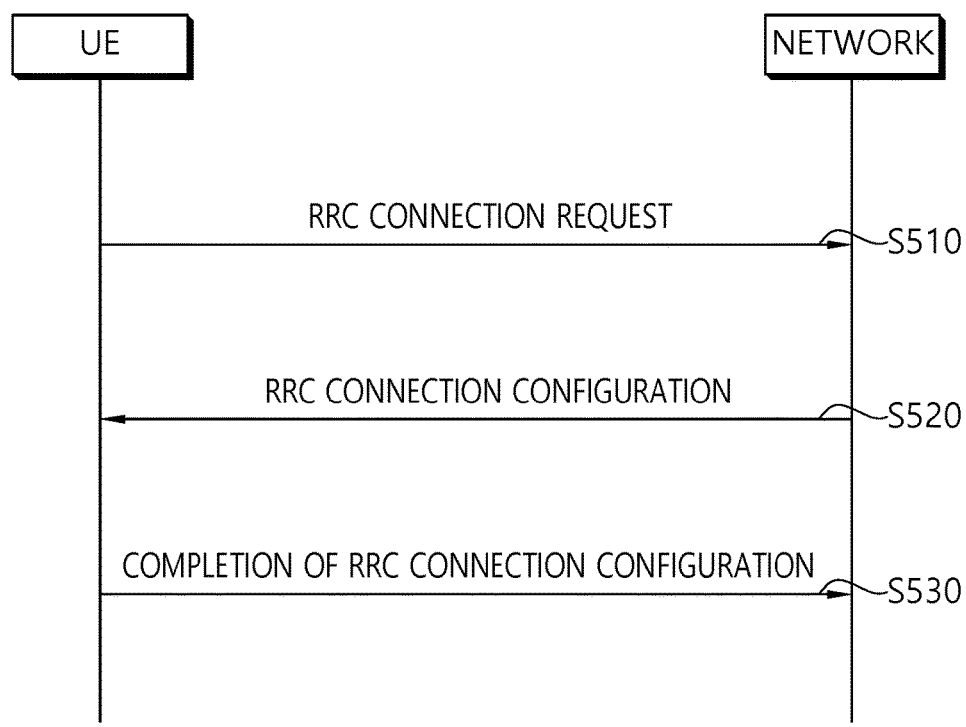
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
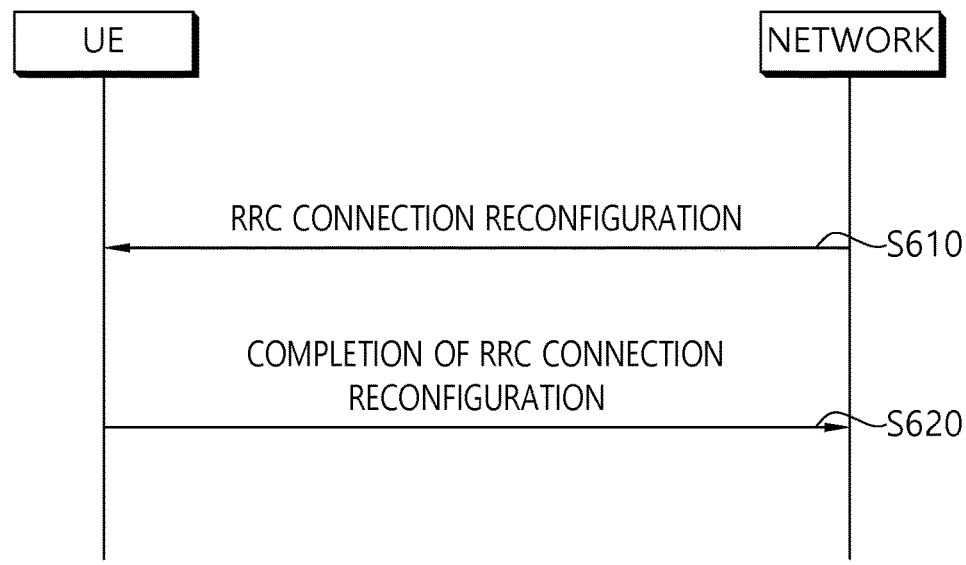
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RB s, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

The cell selection criterion may be defined as below equation 1.

Srxlev>0 AND Squal>0 where $Srxlev = Q_{rxlevmeas} - (Q_{rxlevmin} + Q_{rxlevminoffset}) - P_{compensation}$ $Squal = Q_{qualmeas} - (Q_{qualmin} + Q_{qualminoffset})$ [Equation 1]

Here, the variables in the equation 1 may be defined as below table 1.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | max($P_{EMAX} - P_{PowerClass}$, 0) (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Signalled values, i.e., $Q_{rxlevminoffset}$ and $Q_{qualminoffset}$, may be applied to a case where cell selection is evaluated as a result of periodic search for a higher priority PLMN during a UE camps on a normal cell in a VPLMN. During the periodic search for the higher priority PLMN as described above, the UE may perform the cell selection evaluation by using parameter values stored in other cells of the higher priority PLMN.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows. First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 2.

$$Rs = Qmeas,s + Qhyst, Rn = Qmeas,s - Qoffset \quad \text{[Equation 2]}$$

In this case, Rs is the ranking criterion of a serving cell, Rn is the ranking criterion of a neighbor cell, Qmeas,s is the quality value of the serving cell measured by UE, Qmeas,n is the quality value of the neighbor cell measured by UE, Qhyst is the hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset =0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
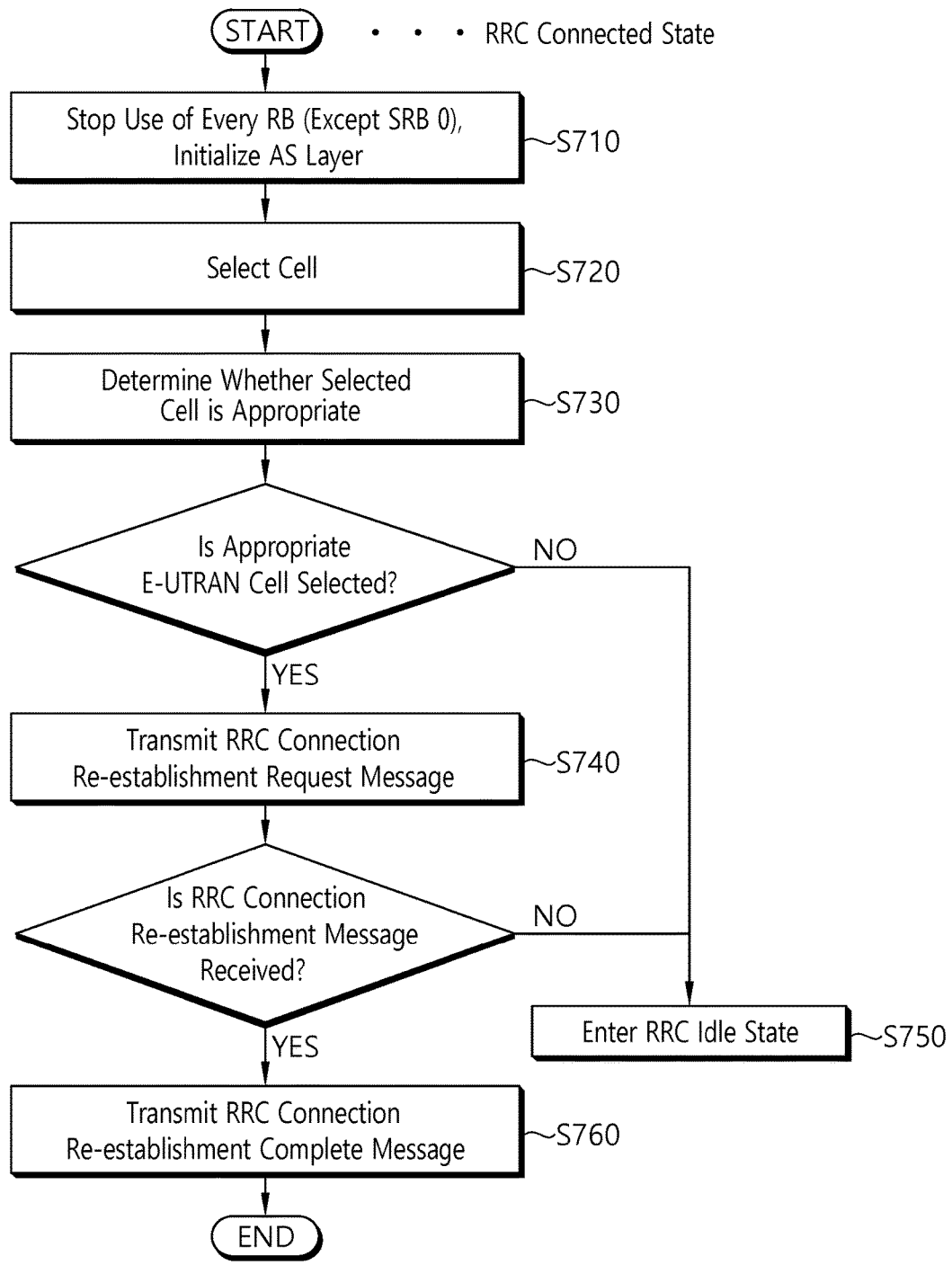
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
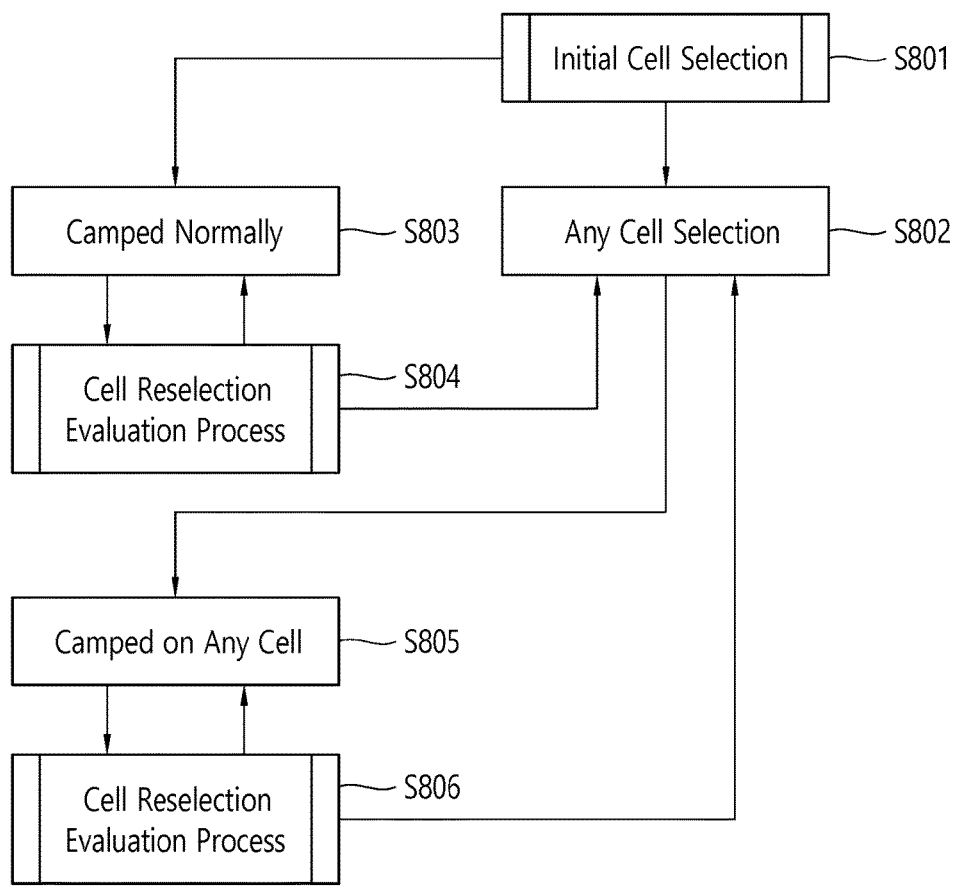
FIG. 8 illustrates substates which may be owned by UE in the RRC_IDLE state and a substate transition process.

FIG. 8 illustrates substates which may be owned by UE in the RRC_IDLE state and a substate transition process.

Referring to FIG. 8, UE performs an initial cell selection process (S801). The initial cell selection process may be performed when there is no cell information stored with respect to a PLMN or if a suitable cell is not discovered.

If a suitable cell is unable to be discovered in the initial cell selection process, the UE transits to any cell selection state (S802). The any cell selection state is the state in which the UE has not camped on a suitable cell and an acceptable cell and is the state in which the UE attempts to discover an acceptable cell of a specific PLMN on which the UE may camp. If the UE has not discovered any cell on which it may camp, the UE continues to stay in the any cell selection state until it discovers an acceptable cell.

If a suitable cell is discovered in the initial cell selection process, the UE transits to a normal camp state (S803). The normal camp state refers to the state in which the UE has camped on the suitable cell. In this state, the UE may select and monitor a paging channel based on information provided through system information and may perform an evaluation process for cell reselection.

If a cell reselection evaluation process (S804) is caused in the normal camp state (S803), the UE performs a cell reselection evaluation process (S804). If a suitable cell is discovered in the cell reselection evaluation process (S804), the UE transits to the normal camp state (S803) again.

If an acceptable cell is discovered in the any cell selection state (S802), the UE transmits to any cell camp state (S805). The any cell camp state is the state in which the UE has camped on the acceptable cell.

In the any cell camp state (S805), the UE may select and monitor a paging channel based on information provided through system information and may perform the evaluation process (S806) for cell reselection. If an acceptable cell is not discovered in the evaluation process (S806) for cell reselection, the UE transits to the any cell selection state (S802).

Now, a device-to-device (D2D) operation is described. In 3GPP LTE-A, a service related to the D2D operation is called a proximity service (ProSe). Now, the ProSe is described. Hereinafter, the ProSe is the same concept as the D2D operation, and the ProSe and the D2D operation may be used without distinction.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Hereinafter, for convenience, the ProSe direct communication may be referred to as D2D communication, and the ProSe direct discovery may be referred to as D2D discovery.

Figure 9:
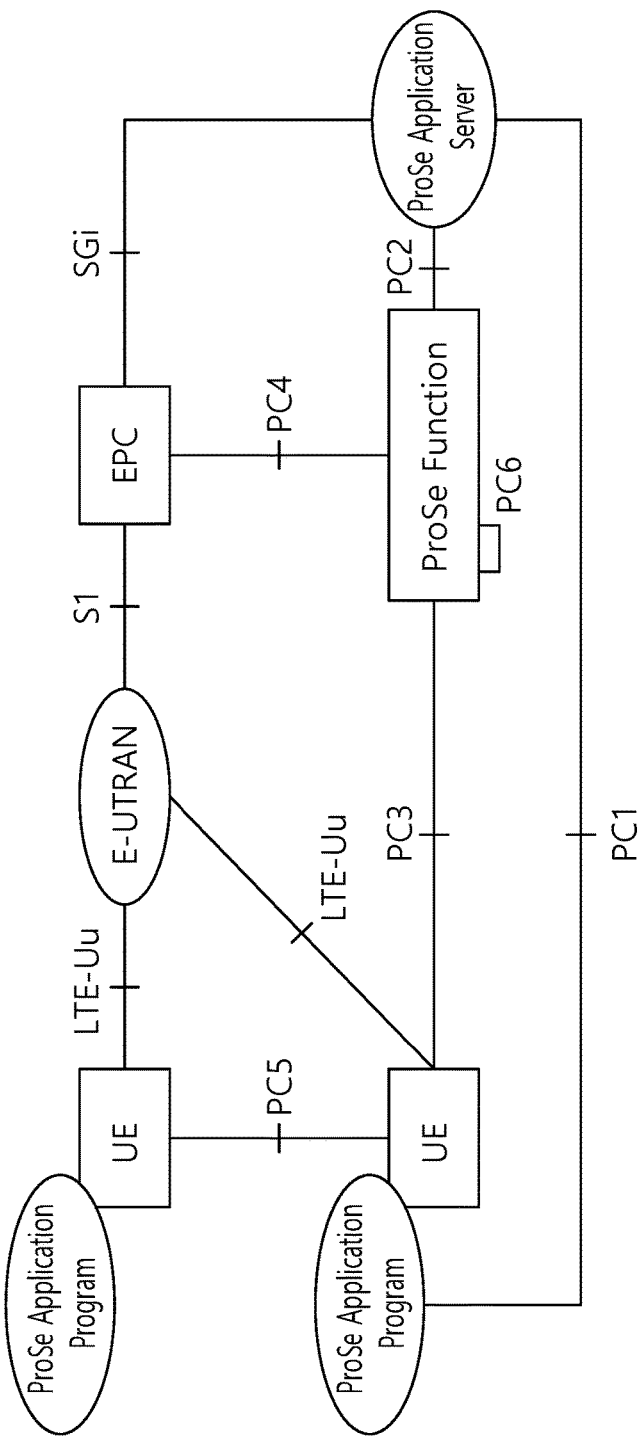
FIG. 9 shows a basic structure for ProSe.

FIG. 9 shows a basic structure for ProSe.

Referring to FIG. 9, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MIME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.
  Interworking via a reference point toward the 3rd party applications
  Authorization and configuration of UE for discovery and direct communication
  Enable the functionality of EPC level ProSe discovery
  ProSe related new subscriber data and handling of data storage, and also handling of the ProSe identities
  Security related functionality
  Provide control towards the EPC for policy related functionality
  Provide functionality for charging (via or outside of the EPC, e.g., offline charging)

A reference point and a reference interface in the basic structure for ProSe are described below.
  PC1: a reference point between the ProSe application program within the UE and the ProSe application program within the ProSe APP server. This is used to define signaling requirements in an application dimension.
  PC2: a reference point between the ProSe APP server and the ProSe function. This is used to define an interaction between the ProSe APP server and the ProSe function. The update of application data in the ProSe database of the ProSe function may be an example of the interaction.
  PC3: a reference point between the UE and the ProSe function. This is used to define an interaction between the UE and the ProSe function. A configuration for ProSe discovery and communication may be an example of the interaction.
  PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.

PC5: a reference point used for using control/user plane for discovery and communication, relay, and 1:1 communication between types of UE.

PC6: a reference point for using a function, such as ProSe discovery, between users belonging to different PLMNs.

SGi: this may be used to exchange application data and types of application dimension control information.

<ProSe Direct Communication>

ProSe direct communication is communication mode in which two types of public safety UE can perform direct communication through a PC 5 interface. Such communication mode may be supported when UE is supplied with services within coverage of an E-UTRAN or when UE deviates from coverage of an E-UTRAN.

Figure 10:
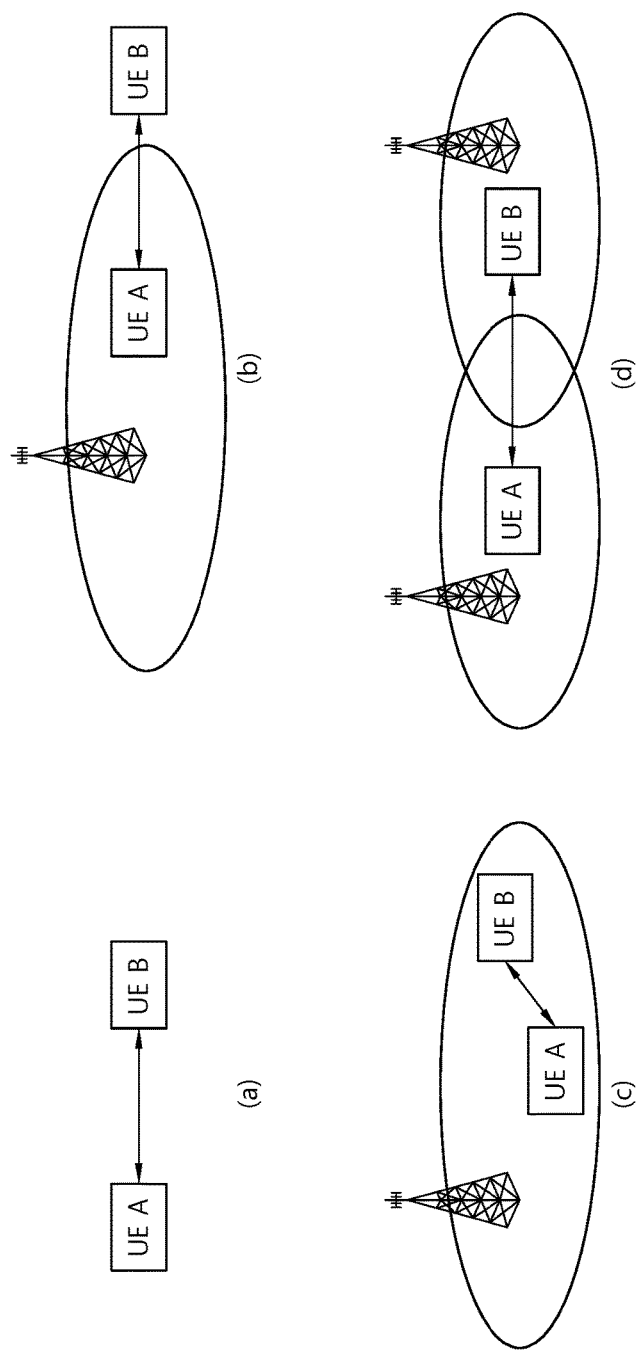
FIG. 10 shows the deployment examples of types of UE performing ProSe direct communication and cell coverage.

FIG. 10 shows the deployment examples of types of UE performing ProSe direct communication and cell coverage.

Referring to FIG. 10(a), types of UE A and B may be placed outside cell coverage. Referring to FIG. 10(b), UE A may be placed within cell coverage, and UE B may be placed outside cell coverage. Referring to FIG. 10(c), types of UE A and B may be placed within single cell coverage. Referring to FIG. 10(d), UE A may be placed within coverage of a first cell, and UE B may be placed within coverage of a second cell.

ProSe direct communication may be performed between types of UE placed at various positions as in FIG. 10.

Meanwhile, the following IDs may be used in ProSe direct communication.

A source layer-2 ID: this ID identifies the sender of a packet in the PC 5 interface.

A destination layer-2 ID: this ID identifies the target of a packet in the PC 5 interface.

An SA LI ID: this ID is the ID of scheduling assignment (SA) in the PC 5 interface.

Figure 11:
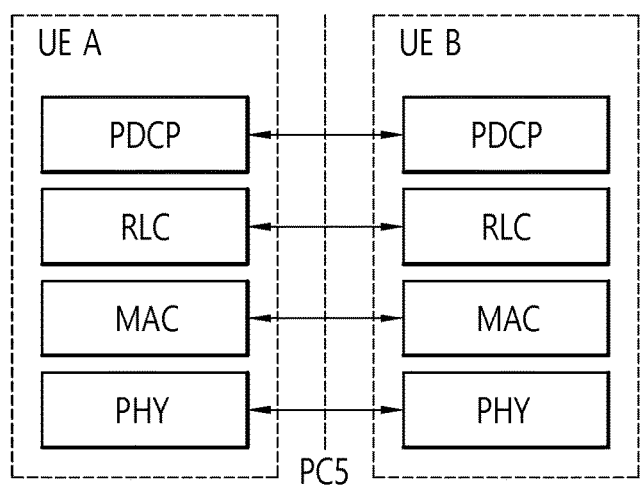
FIG. 11 shows a user plane protocol stack for ProSe direct communication.

FIG. 11 shows a user plane protocol stack for ProSe direct communication.

Referring to FIG. 11, the PC 5 interface includes a PDCH, RLC, MAC, and PHY layers.

In ProSe direct communication, I-IARQ feedback may not be present. An MAC header may include a source layer-2 ID and a destination layer-2 ID.

<Radio Resource Assignment for ProSe Direct Communication>

ProSe-enabled UE may use the following two types of mode for resource assignment for ProSe direct communication.

1. Mode 1

Mode 1 is mode in which resources for ProSe direct communication are scheduled by an eNB. UE needs to be in the RRC_CONNECTED state in order to send data in accordance with mode 1. The UE requests a transmission resource from an eNB. The eNB performs scheduling assignment and schedules resources for sending data. The UE may send a scheduling request to the eNB and send a ProSe Buffer Status Report (BSR). The eNB has data to be subjected to ProSe direct communication by the UE based on the ProSe BSR and determines that a resource for transmission is required.

2. Mode 2

Mode 2 is mode in which UE directly selects a resource. UE directly selects a resource for ProSe direct communication in a resource pool. The resource pool may be configured by a network or may have been previously determined.

Meanwhile, if UE has a serving cell, that is, if the UE is in the RRC_CONNECTED state with an eNB or is placed in a specific cell in the RRC_IDLE state, the UE is considered to be placed within coverage of the eNB.

If UE is placed outside coverage, only mode 2 may be applied. If the UE is placed within the coverage, the UE may use mode 1 or mode 2 depending on the configuration of an eNB.

If another exception condition is not present, only when an eNB performs a configuration, UE may change mode from mode 1 to mode 2 or from mode 2 to mode 1.

<ProSe Direct Discovery>

ProSe direct discovery refers to a procedure that is used for ProSe-enabled UE to discover another ProSe-enabled UE in proximity and is also called D2D direct discovery. In this case, E-UTRA radio signals through the PC 5 interface may be used. Information used in ProSe direct discovery is hereinafter called discovery information.

Figure 12:
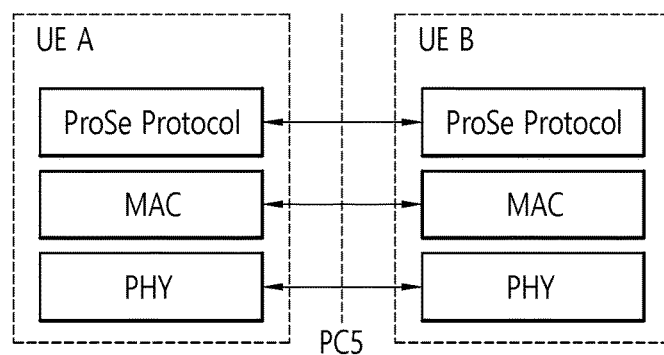
FIG. 12 shows the PC 5 interface for D2D direct discovery.

FIG. 12 shows the PC 5 interface for D2D direct discovery.

Referring to FIG. 12, the PC 5 interface includes an MAC layer, a PHY layer, and a ProSe Protocol layer, that is, a higher layer. The higher layer (the ProSe Protocol) handles the permission of the announcement and monitoring of discovery information. The contents of the discovery information are transparent to an access stratum (AS). The ProSe Protocol transfers only valid discovery information to the AS for announcement.

The MAC layer receives discovery information from the higher layer (the ProSe Protocol). An IP layer is not used to send discovery information. The MAC layer determines a resource used to announce discovery information received from the higher layer. The MAC layer produces an MAC protocol data unit (PDU) for carrying discovery information and sends the MAC PDU to the physical layer. An MAC header is not added.

In order to announce discovery information, there are two types of resource assignment.

1. Type 1

As a method in which resources for announcement of discovered information are allocated not specifically to a terminal, a base station provides a resource pool configuration for announcement of the discovered information to terminals. The configuration is included in a system information block (SIB) to be signaled by a broadcast scheme. Alternatively, the configuration may be provided while being included in a terminal specific RRC message. Alternatively, the configuration may be broadcast signaling of another layer except for an RRC message or terminal specific signaling.

The terminal autonomously selects the resource from an indicated resource pool and announces the discovery information by using the selected resource. The terminal may announce the discovery information through an arbitrarily selected resource during each discovery period.

2. Type 2

The type 2 is a method for assigning a resource for announcing discovery information in a UE-specific manner. UE in the RRC_CONNECTED state may request a resource for discovery signal announcement from an eNB through an RRC signal. The eNB may announce a resource for discovery signal announcement through an RRC signal. A resource for discovery signal monitoring may be assigned within a resource pool configured for types of UE.

An eNB 1) may announce a type 1 resource pool for discovery signal announcement to UE in the RRC_IDLE state through the SIB. Types of UE whose ProSe direct discovery has been permitted use the type 1 resource pool for discovery information announcement in the RRC_IDLE state. Alternatively, the eNB 2) announces that the eNB supports ProSe direct discovery through the SIB, but may not provide a resource for discovery information announcement. In this case, UE needs to enter the RRC_CONNECTED state for discovery information announcement.

An eNB may configure that UE has to use a type 1 resource pool for discovery information announcement or has to use a type 2 resource through an RRC signal in relation to UE in the RRC_CONNECTED state.

Figure 13:
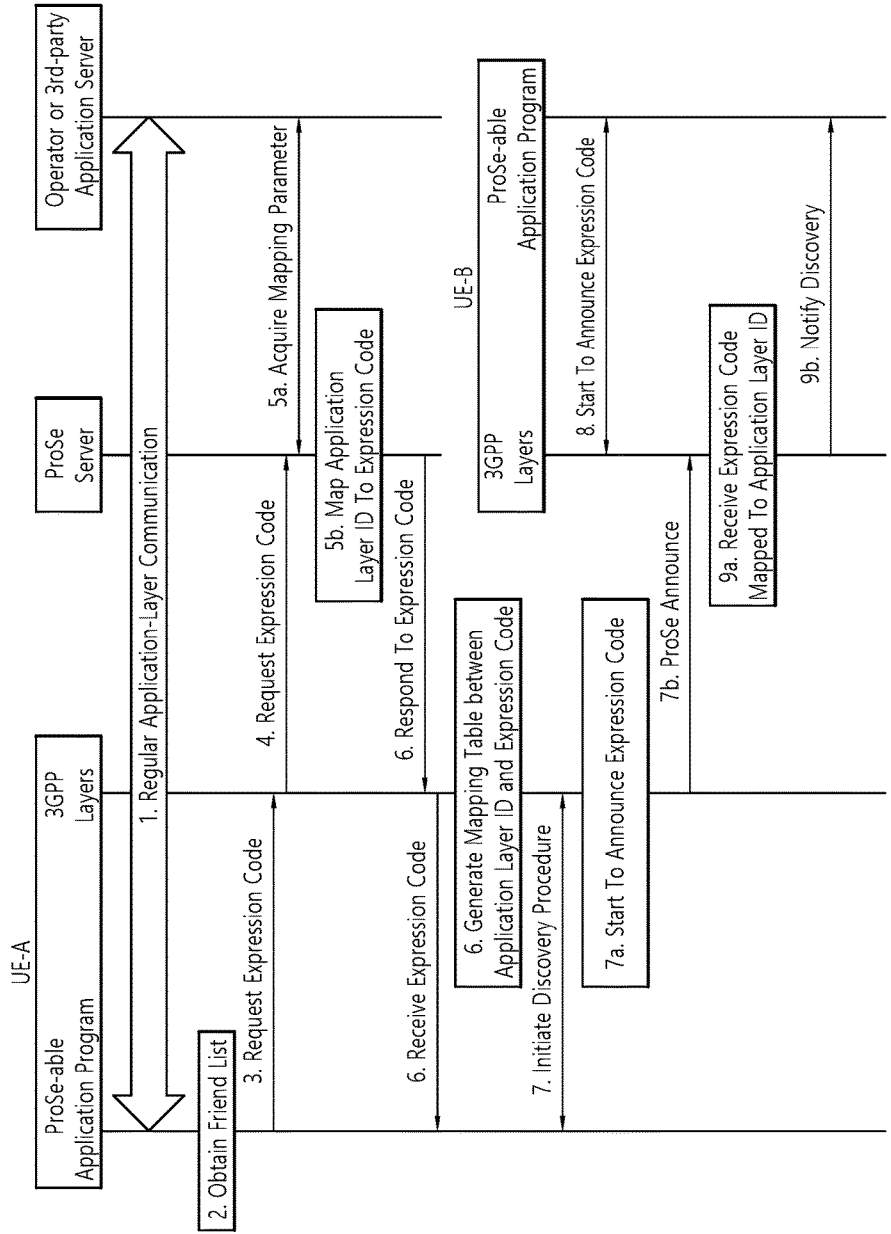
FIG. 13 is an embodiment of a ProSe discovery process.

FIG. 13 is an embodiment of a ProSe discovery process.

Referring to FIG. 13, it is assumed that UE A and UE B have ProSe-enabled application programs managed therein and have been configured to have a 'friend' relation between them in the application programs, that is, a relationship in which D2D communication may be permitted between them. Hereinafter, the UE B may be represented as a 'friend' of the UE A. The application program may be, for example, a social networking program. '3GPP Layers' correspond to the functions of an application program for using ProSe discovery service, which have been defined by 3GPP.

Direct discovery between the types of UE A and B may experience the following process.

1. First, the UE A performs regular application layer communication with the APP server. The communication is based on an Application Program Interface (API).

2. The ProSe-enabled application program of the UE A receives a list of application layer IDs having a 'friend' relation. In general, the application layer ID may have a network access ID form. For example, the application layer ID of the UE A may have a form, such as "adam@example.com."

3. The UE A requests private expressions code for the user of the UE A and private representation code for a friend of the user.

4. The 3GPP layers send a representation code request to the ProSe server.

5. The ProSe server maps the application layer IDs, provided by an operator or a third party APP server, to the private representation code. For example, an application layer ID, such as adam@example.com, may be mapped to private representation code, such as "GTER543$#2FSJ67DFSF." Such mapping may be performed based on parameters (e.g., a mapping algorithm, a key value and so on) received from the APP server of a network.

6. The ProSe server sends the types of derived representation code to the 3GPP layers. The 3GPP layers announce the successful reception of the types of representation code for the requested application layer ID to the ProSe-enabled application program. Furthermore, the 3GPP layers generate a mapping table between the application layer ID and the types of representation code.

7. The ProSe-enabled application program requests the 3GPP layers to start a discovery procedure. That is, the ProSe-enabled application program requests the 3GPP layers to start discovery when one of provided 'friends' is placed in proximity to the UE A and direct communication is possible. The 3GPP layers announces the private representation code (i.e., in the above example, "GTER543$#2FSJ67DFSF", that is, the private representation code of adam@example.com) of the UE A. This is hereinafter called 'announcement'. Mapping between the application layer ID of the corresponding application program and the private representation code may be known to only 'friends' which have previously received such a mapping relation, and the 'friends' may perform such mapping.

8. It is assumed that the UE B operates the same ProSe-enabled application program as the UE A and has executed the aforementioned 3 to 6 steps. The 3GPP layers placed in the UE B may execute ProSe discovery.

9. When the UE B receives the aforementioned 'announce' from the UE A, the UE B determines whether the private representation code included in the 'announce' is known to the UE B and whether the private representation code is mapped to the application layer ID. As described the 8 step, since the UE B has also executed the 3 to 6 steps, it is aware of the private representation code, mapping between the private representation code and the application layer ID, and corresponding application program of the UE A. Accordingly, the UE B may discover the UE A from the 'announce' of the UE A. The 3GPP layers announce that adam@example.com has been discovered to the ProSe-enabled application program within the UE B.

In FIG. 13, the discovery procedure has been described by taking into consideration all of the types of UE A and B, the ProSe server, the APP server and so on. From the viewpoint of the operation between the types of UE A and B, the UE A sends (this process may be called announcement) a signal called announcement, and the UE B receives the announce and discovers the UE A. That is, from the aspect that an operation that belongs to operations performed by types of UE and that is directly related to another UE is only step, the discovery process of FIG. 13 may also be called a single step discovery procedure.

Figure 14:
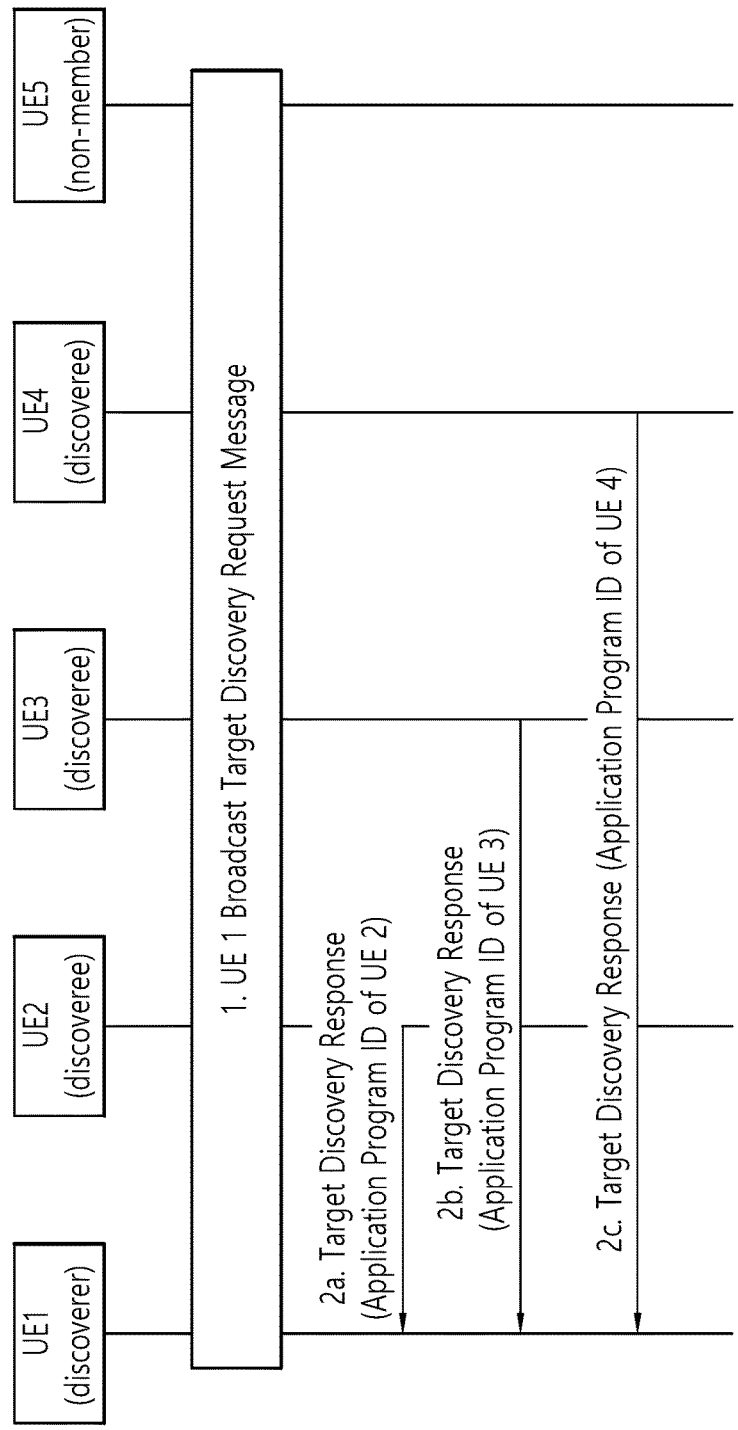
FIG. 14 is another embodiment of a ProSe discovery process.

FIG. 14 is another embodiment of a ProSe discovery process.

In FIG. 14, types of UE 1 to 4 are assumed to types of UE included in specific group communication system enablers (GCSE) group. It is assumed that the UE 1 is a discoverer and the types of UE 2, 3, and 4 are discoveree. UE 5 is UE not related to the discovery process.

The UE 1 and the UE 2-4 may perform a next operation in the discovery process.

First, the UE 1 broadcasts a target discovery request message (may be hereinafter abbreviated as a discovery request message or M1) in order to discover whether specific UE included in the GCSE group is in proximity. The target discovery request message may include the unique application program group ID or layer-2 group ID of the specific GCSE group. Furthermore, the target discovery request message may include the unique ID, that is, application program private ID of the UE 1. The target discovery request message may be received by the types of UE 2, 3, 4, and 5.

The UE 5 sends no response message. In contrast, the types of UE 2, 3, and 4 included in the GCSE group send a target discovery response message (may be hereinafter abbreviated as a discovery response message or M2) as a response to the target discovery request message. The target discovery response message may include the unique application program private ID of UE sending the message.

An operation between types of UE in the ProSe discovery process described with reference to FIG. 14 is described below. The discoverer (the UE 1) sends a target discovery request message and receives a target discovery response message, that is, a response to the target discovery request message. Furthermore, when the discoveree (e.g., the UE 2) receives the target discovery request message, it sends a target discovery response message, that is, a response to the target discovery request message. Accordingly, each of the types of UE performs the operation of the 2 step. In this aspect, the ProSe discovery process of FIG. 14 may be called a 2-step discovery procedure.

In addition to the discovery procedure described in FIG. 14, if the UE 1 (the discoverer) sends a discovery conform message (may be hereinafter abbreviated as an M3), that is, a response to the target discovery response message, this may be called a 3-step discovery procedure.

The present invention will now be described.

Hereinafter, the sidelink means a terminal-to-terminal interface. Sidelink actions that may be performed in the sidelink include ProSe communication (which may be referred in the same meaning to as sidelink communication, D2D communication or simply communication) and ProSe discovery (which may be referred in the same meaning to as sidelink discovery, D2D discovery, or simply discovery).

In a prior art, transmission of the discovery signal during the ProSe action (operation) was always performed only in the serving cell of the terminal and was performed based on a configuration of the serving cell. The terminal could not inform the network of which frequency the terminal was interested in transmitting the discovery signal (also referred to as an announcement of the discovery signal). In terms of signaling, the sidelink terminal information (SidelinkUEInfonnation) used by the terminal to inform a base station of the sidelink information does not include a field indicating the frequency on which the terminal is interested in transmitting the detection signal.

The following table is an example of conventional sidelink terminal information

As shown in Table 2, in a prior art, there is no field in the sidelink terminal information for informing the network of the frequency on which the terminal is interested in transmitting the discovery signal. In addition, information informing which cell the terminal uses to transmit the detection signal is neither included in the conventional sidelink terminal information.

Figure 15:
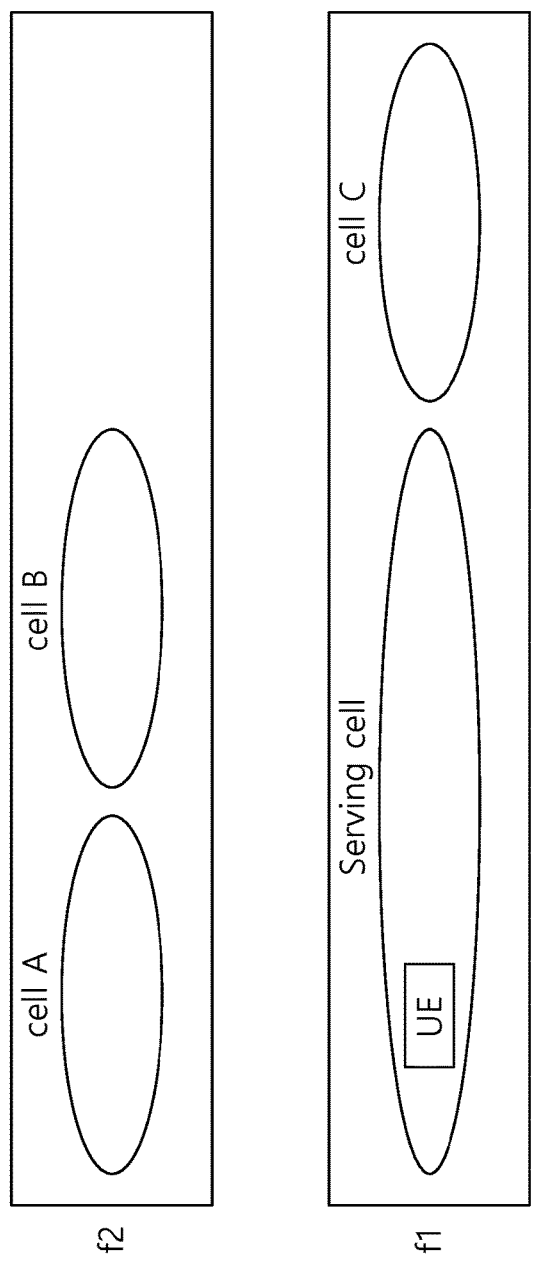
FIG. 15 shows an example in which a terminal performs a sidelink action in a future wireless communication system.

FIG. 15 shows an example in which a terminal perfoims a sidelink action in a future wireless communication system.

Referring to FIG. 15, f1 is a serving frequency for the terminal and f2 is a non-serving frequency for the terminal.

In the serving frequency f1, there may be a serving cell for the terminal and a cell C which is the non-serving cell for the terminal. In the non-serving frequency f2, there may be a cell A and cell B which is the non-serving cell for the terminal.

In a prior art, it is assumed that a terminal transmits the discovery signal only in the serving cell. However, in the future wireless communication system, it is assumed that a terminal can transmit the discovery signal in other cells other than the serving cell. For example, the terminal may transmit a discovery signal in the cell C, which is the non-serving cell at the serving frequency, or may transmit the discovery signal in the cell A or cell B, which is the non-serving cell at a non-serving frequency.

Here, the fact that the terminal transmits the discovery signal in the cell A may mean that the discovery signal is transmitted by applying 'parameters or configuration for transmitting the discovery signal' configured or defined for the cell A.

TABLE 2

```
-- ASN1START
SidelinkUEInformation-r12 ::=          SEQUENCE {
    criticalExtensions                     CHOICE {
        c1                                     CHOICE {
            sidelinkUEInformation-r12              SidelinkUEInformation-r12-IEs,
            spare3 NULL, spare2 NULL, spare1 NULL
        },
        criticalExtensionsFuture               SEQUENCE { }
    }
}
SidelinkUEInformation-r12-IEs ::=      SEQUENCE {
    commRxInterestedFreq-r12               ARFCN-ValueEUTRA-r9
        OPTIONAL,
    commTxResourceReq-r12                  SL-CommTxResourceReq-
r12 OPTIONAL,
    discRxInterest-r12                     ENUMERATED {true}
        OPTIONAL,
    discTxResourceReq-r12                  INTEGER (1..63)
        OPTIONAL,
    lateNonCriticalExtension               OCTET STRING
        OPTIONAL,
    nonCriticalExtension                   SEQUENCE { }
        OPTIONAL
}
SL-CommTxResourceReq-r12 ::=           SEQUENCE {
    carrierFreq-r12                        ARFCN-ValueEUTRA-r9
        OPTIONAL,
    destinationInfoList-r12                SL-DestinationInfoList-r12
}
SL-DestinationInfoList-r12 ::=         SEQUENCE (SIZE (1..maxSL-Dest-r12)) OF SL-
DestinationIdentity-r12
SL-DestinationIdentity-r12 ::=         BIT STRING (SIZE (24))
-- ASN1STOP
```

In the above table, the 'commRxInterestedFreq' indicates the frequency on which the terminal is interested in receiving sidelink communication. The 'commTxResourceReq' indicates the frequency on which the terminal is interested in transmitting the sidelink communication. The 'discRxInterest' indicates that the terminal is interested in monitoring the sidelink discovery.

As described above, when the conventional sidelink terminal information is applied to the future radio communication system in which the discovery signal can be transmitted in various schemes, efficiency in the transmission system is reduced through the sidelink discovery procedure. For example, when a specific terminal desires to transmit the discovery signal in other cell other than its serving cell (primary cell), it may be necessary for the network to enable the discovery signal transmission by not scheduling the uplink signal transmission by cellular communication in the other cell to a specific terminal. However, if the terminal does not provide the network with information on the other cell, the network cannot perform scheduling in consideration of the terminal which is desired to transmit the discovery signal.

Method with which these problems can be solved will now be described.

When the terminal enters an RRC connection state, the terminal can transmit the sidelink terminal information to the base station. The sidelink terminal information may include a list of frequencies on which the terminal is interested in announcing/receiving/transmitting and receiving the discovery signal. The frequencies included in the list may include a serving frequency and a non-serving frequency of the terminal.

Meanwhile, the terminal may be interested in 1) transmitting the discovery signal at the serving frequency, and 2) transmitting the discovery signal at the non-serving frequency. For each of the above two cases, the terminal may operate as follows.

First, if the terminal is interested in transmitting the discovery signal at the serving frequency, then the terminal may transmit the discovery signal by using a ProSe configuration corresponding to a secondary cell. The terminal may perform one of the following actions to inform the network that it is interested in transmitting the discovery signal and to request a transmission resource to be used for discovery signal transmission.

The sidelink terminal information in which a frequency of the targeted non-serving cell and a physical cell ID of the non-serving cell is included, may be transmitted to the network. That is, the terminal transmits the frequency on which the non-serving cell for which the discovery signal is desired to be transmitted is located, and the ID of the non-serving cell to the network, by including it in the sidelink terminal information.

Alternatively, the terminal may inform an index of the serving cell or inform a frequency of the serving cell as a part of 'transmission resource request' requesting a transmission resource for transmitting the discovery signal.

Alternatively, the terminal may inform the network of a global cell ID of the cell to which the discovery signal is desired to be transmitted.

Next, the terminal may be interested in transmitting the discovery signal at the non-serving frequency. That is, you may want to announce discovery signals at non-serving frequencies. In this case, the terminal may transmit the discovery signal using the ProSe configuration corresponding to the selected cell for ProSe action (i.e., discovery signal transmission) at the non-serving frequency.

In order to inform that it is interested in the discovery signal transmission and to request resources for discovery signal transmission, the terminal may operate as follows.

The terminal may inform the network of the frequency of the non-serving cell to which the discovery signal is to be transmitted and the physical cell ID of the non-serving cell. That is, the terminal transmits the frequency in which the non-serving cell to which the discovery signal is to be transmitted and the ID of the non-serving cell to the network, in the sidelink terminal information.

Alternatively, the terminal may inform the global cell ID of a target cell located at a frequency at which a discovery signal is to be transmitted.

Figure 16:
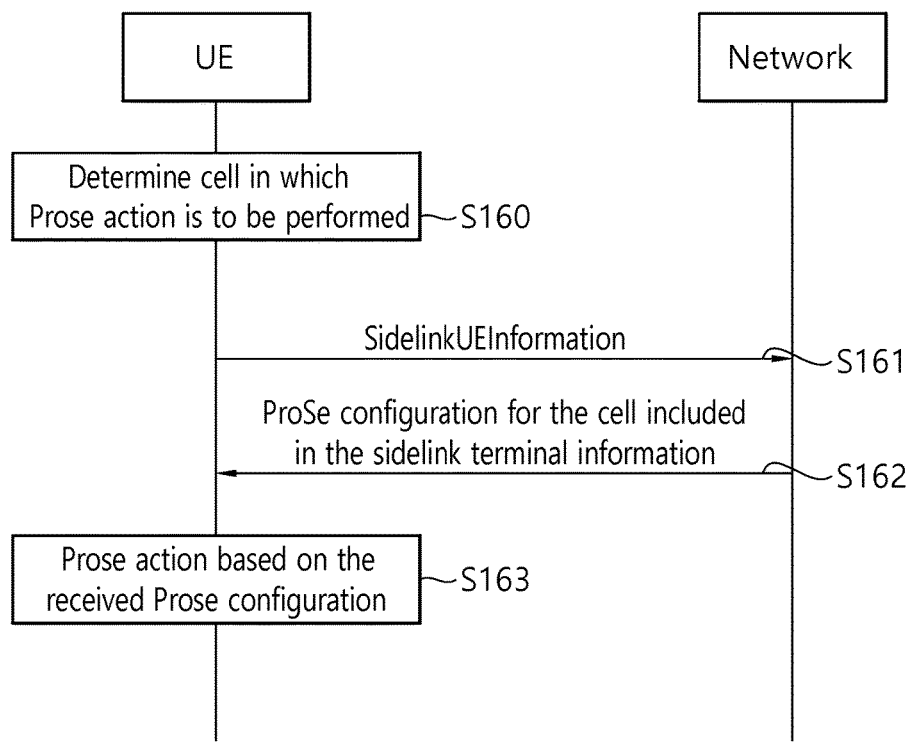
FIG. 16 illustrates a sidelink terminal information transmission method of a terminal according to an embodiment of the present invention.

FIG. 16 illustrates a sidelink terminal information transmission method of a teiniinal according to an embodiment of the present invention.

Referring to FIG. 16, a terminal determines a cell to perform a ProSe action (S160). As described above, the cell may be a non-serving cell located at a non-serving frequency for the terminal or a non-serving cell located at a serving frequency for the terminal.

The terminal transmits the sidelink terminal information to the network (S161).

The information included in the sidelink terminal information has been described above. For example, if the sidelink terminal information includes the frequency of the non-serving cell and the physical cell ID of the non-serving cell for which the terminal desires to transmit the discovery signal, the sidelink terminal information may be configured as follows.

TABLE 3

```
-- ASN1START
SidelinkUEInformation-r13 ::=        SEQUENCE {
    criticalExtensions                   CHOICE {
        c1                                   CHOICE {
            sidelinkUEInformation-r13            SidelinkUEInformation-r13-IEs,
            spare3 NULL, spare2 NULL, spare1 NULL
        },
        criticalExtensionsFuture             SEQUENCE { }
    }
}
SidelinkUEInformation-r13-IEs ::=    SEQUENCE {
    commRxInterestedFreq-r13             ARFCN-ValueEUTRA-r9
    OPTIONAL,
    commTxResourceReq-r13                SL-CommTxResourceReq-r13
    OPTIONAL,
    discRxInterest-r13                   ENUMERATED {true}
    OPTIONAL,
    discTxResourceReq-r13                INTEGER (1..63)
    OPTIONAL,
    discTxInterestFreq-r13
    lateNonCriticalExtension             OCTET STRING
    OPTIONAL,
    nonCriticalExtension                 SEQUENCE { }
    OPTIONAL
}
```

TABLE 3-continued

```
discTxInterestFreq-r13::=         SEQUENCE {
    carrierFreq-r13                   ARFCN-ValueEUTRA-r9
    PhysicalCellID
}
SL-CommTxResourceReq-r13 ::=      SEQUENCE {
    carrierFreq-r13                   ARFCN-ValueEUTRA-r9
    OPTIONAL,
    destinationInfoList-r13           SL-DestinationInfoList-r13
}
SL-DestinationInfoList-r13 ::=    SEQUENCE (SIZE (1..maxSL-Dest-r13)) OF SL-
DestinationIdentity-r13
SL-DestinationIdentity-r13 ::=    BIT STRING (SIZE (24))
-- ASN1STOP
```

In Table 3, the 'discTxInterestFreq' indicates a frequency of a non-serving cell in which a terminal desires to transmit a discovery signal and a physical cell ID of the non-serving cell.

In Table 3, only one 'discTxInterestFreq' is included, but, it is not a limitation, and a plurality of 'discTxInterestFreq' may be included in the form of a list.

The network provides the terminal with the ProSe configurations for the cells included in the sidelink terminal information (S162). For example, if the terminal informs the non-serving cell that it is interested in transmitting the discovery signal through the sidelink terminal information is cell B and the corresponding frequency is f2, the network informs the terminal of the parameters (configuration) the discovery signal transmission configured for the cell B. If cells A and B are present at f2, then there is no need to inform 'the parameters (configuration) for transmission of the discovery signal' for the cell A, and thus the signaling overhead is reduced.

The terminal performs the ProSe action based on the received ProSe configuration (S163). In the above example, an example of a ProSe action is that a terminal transmits a discovery signal.

Figure 17:
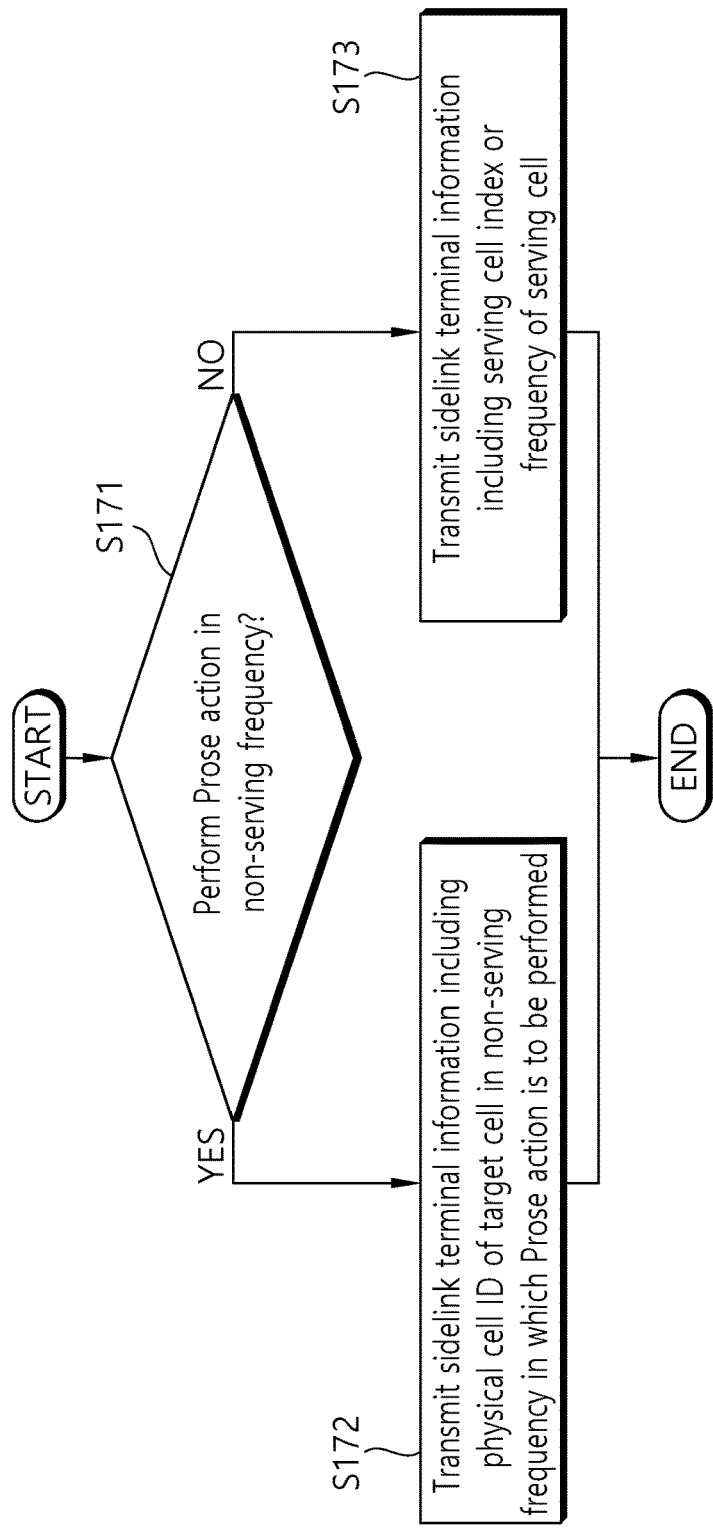
FIG. 17 shows a sidelink terminal information transmission method of a terminal according to an embodiment of the present invention.

FIG. 17 shows a sidelink terminal information transmission method of a terminal according to an embodiment of the present invention.

The terminal determines whether it wishes to perform a ProSe action (e.g., discovery signal transmission) to the non-serving frequency (S171).

If the ProSe action is to be performed at the non-serving frequency, the sidelink terminal information including the physical cell ID of the target cell of the non-serving frequency for performing the ProSe operation is transmitted to the network (S172). The sidelink terminal information may also include information indicating the frequency of the target cell along with the physical cell ID of the target cell of the non-serving frequency.

On the other hand, when the ProSe action is to be performed at the serving frequency, the sidelink terminal information including the serving cell index (ID) or the frequency of the serving cell is transmitted to the network (S173). The serving cell index (ID) may be transmitted (i.e., included) as part of a 'transmission resource request' requesting a resource for discovery signal transmission. According to this method, when the terminal desires to perform the ProSe action at the serving frequency, only the information indicating the serving cell index or the frequency of the serving cell is included in the sidelink terminal information, thereby reducing the signaling overhead.

Figure 18:
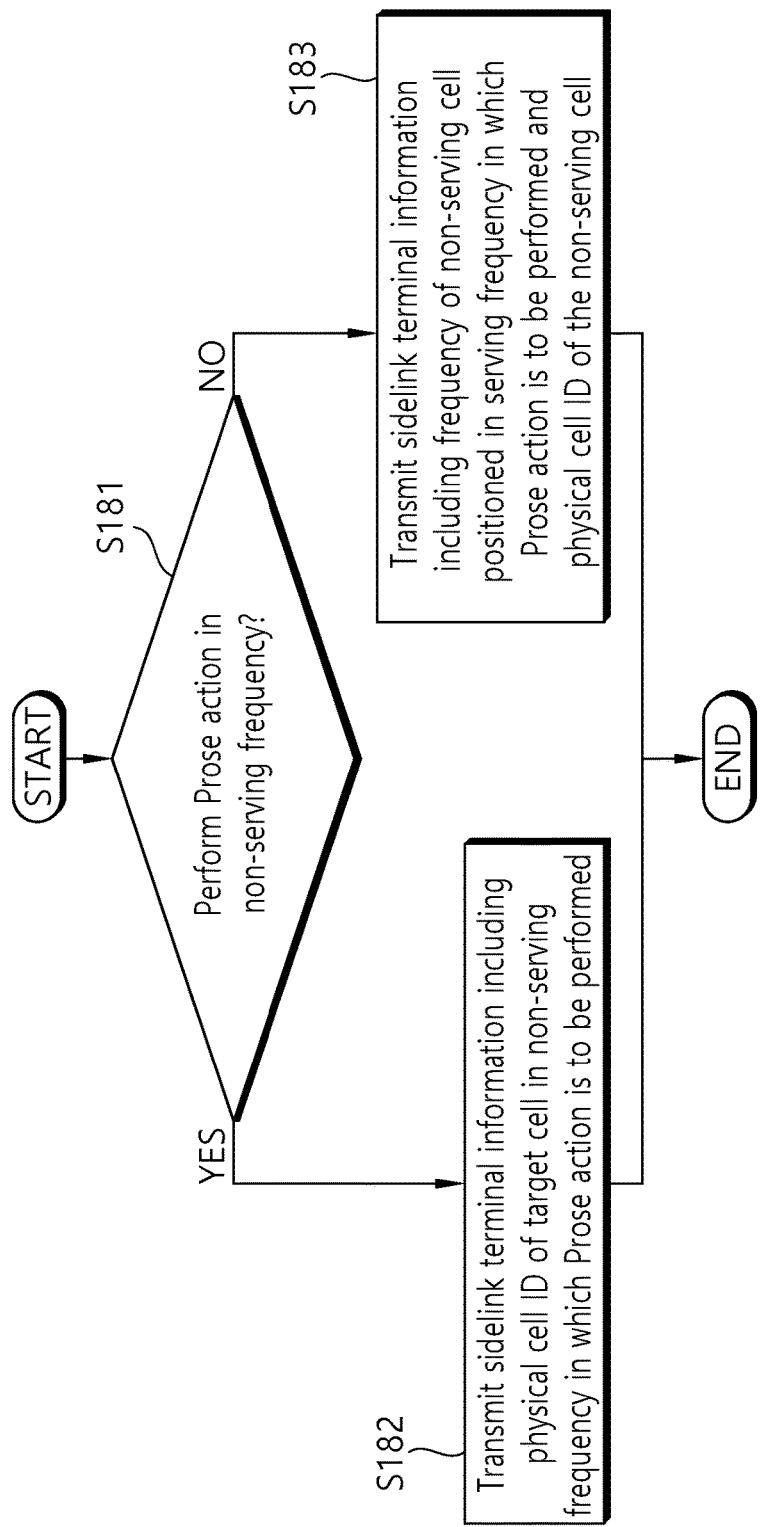
FIG. 18 shows a sidelink terminal information transmission method of a terminal according to another embodiment of the present invention.

FIG. 18 shows a sidelink terminal information transmission method of a terminal according to another embodiment of the present invention.

The terminal determines whether it wishes to perform a ProSe action (e.g., discovery signal transmission) to the non-serving frequency (S181).

If the ProSe action is to be performed at the non-serving frequency, the sidelink terminal information including the physical cell ID of the target cell of the non-serving frequency for performing the ProSe action is transmitted to the network at step (S182). The sidelink terminal information may also include information indicating the frequency of the target cell along with the physical cell ID of the target cell of the non-serving frequency. This is the same as in FIG. 17.

On the other hand, when a ProSe action is to be performed at the serving frequency, sidelink terminal information including the frequency of the non-serving cell located at the serving frequency for performing the ProSe action and the physical cell ID of the non-serving cell is transmitted to the network (S183). This process is different from FIG. 17.

If the overhead difference in signaling both the frequency of the non-serving cell and the physical cell ID of the non-serving cell and the signaling of the index of the serving cell (or the frequency of the serving cell) is not large, it may be advantageous in that the signal can be signaled in the same type of sidelink terminal information regardless of the frequency at which the terminal desires to transmit the detection signal, thereby reducing the complexity.

On the other hand, if a new cell is selected for ProSe in a state where the terminal has already informed the network of the cell selected for ProSe action, the terminal can trigger the action of transmitting the sidelink terminal information to the network.

The terminal can inform the network that the cell selected for the ProSe action has been changed through the sidelink terminal information. The terminal can inform the network of the selected new cell.

If the resource corresponding to the selected new cell is not available, the terminal suspends the ProSe action. If the resource corresponding to the selected new cell is available, the terminal performs a ProSE action using the resource corresponding to the selected new cell.

As a result of performing cell reselection in frequency at a frequency that is interesting to transmit a signal according to the ProSe action, the terminal can select the new cell at the same frequency. If the cell selected for the ProSe action has already been informed to the network and is not interested in ProSe action in any cell at a particular frequency where the selected cell is located, the terminal is no longer interested in transmitting the discovery signal in the cell to the network through the sidelink terminal information. In this case, the terminal may delete the specific frequency from the list of frequencies that are interested in transmitting the discovery signal.

When receiving the sidelink terminal information indicating that the terminal is interested in the ProSe transmission, if the base station knows the transmission resource pool parameters for the cell of the frequency which the terminal has found to be interested in transmitting the detection signal, and may signal full parameters to the terminal. In this case, the terminal can transmit a discovery signal at a different frequency using the transmission resource pool parameter.

That is, the base station can transmit the transmission resource pool parameter set for the cell having the frequency that the terminal is interested in the ProSe action as auxiliary information for the terminal through the dedicated signal for the terminal.

If the base station does not know the transmission resource pool parameter for a cell of another frequency which is interested in the discovery signal transmission, the base station cannot consider the discovery signal transmission at the different frequency in the UL scheduling for the terminal. In this case, whenever the uplink scheduling by the cellular communication overlaps with the discovery signal transmission, the terminal may need to drop the discovery signal transmission based on the principle of prioritizing cellular communication. However, when this action is performed, performance of the D2D discovery action at the different frequency will be degraded. In addition, the terminal, which has not received the transmission resource pool parameter for a cell having a different frequency from the serving cell, has a burden of directly receiving system information of another frequency and acquiring transmission resource pool parameters, and has a burden of monitoring reception of a value tag of a paging message or system information in a cell of another frequency in order to determine whether the system information is newly updated information or has been changed.

Upon receiving sidelink terminal information indicating that it is no longer interested in a ProSe action (for example, ProSe transmission) at a specific frequency, the base station may perform scheduling without further consideration of the ProSe action at the specific frequency.

Meanwhile, the terminal can report a transmission resource pool parameter corresponding to a cell of a frequency at which the terminal is interested in transmitting the discovery signal to the network. For example, suppose a terminal with cell 1 positioned at frequency f1 is interested in transmitting a discover signal at cell 2 at frequency f2. In this case, if the terminal considers that the cell 1 does not know the transmission resource pool of the cell 2, when the terminal requests the cell 1 for transmission of the discovery signal, it can report the transmission resource pool of the cell 2 is. The terminal can report the transmission resource pool of cell 2 to cell 1 through the sidelink terminal information.

Although the present invention has been described for the D2D discovery signal, it can also be applied to D2D communication.

In order to support discovery signaling in a non-Pcell, the terminal should first select a cell to be used for discovery signal transmission. At this time, rules applied to ProSe communication can be applied. According to the above rule, the terminal performs additional frequency-to-frequency cell reselection based on additional measurement.

This measurement can also be used when an RSRP based transmission resource pool selection is performed for discovery signal transmission in a cell other than the Pcell.

The terminal can perform measurements on cells that are not Pcells. It may not be required to measure a cell having a lower priority than the Pcell according to the current measurement requirement (requirement). As for transmitting the discovery signal in a cell that is not a Pcell without making measurements beyond the current requirements, it will often cause delays.

If the terminal in the RRC idle state is interested in transmitting the discovery signal in a non-Pcell (located at a frequency other than the serving frequency), it can perform the measurement on the cell regardless of the priority of the frequency.

Additional measurements defined for ProSe communication can be applied to measurements performed by a terminal that is in the RRC idle state and interested in discovery signal transmission on the frequency of the cell, not the Pcell.

Upon receiving the transmission resource parameters and the auxiliary information for the non-Pcell, the terminal may use the transmission resource pool and other information for the discovery signal transmission at the frequency without identifying the MIB, SIB1, SIB19, or the like of the cell.

When the network receives the sidelink terminal information indicating that it is interested in signal transmission (or reception) according to the ProSe action from the terminal, the network transmits the sidelink terminal information to the cell of the frequency at which the terminal is interested If the transmission (or reception) resource pool parameter is known, the transmission resource pool parameter may be informed to the terminal. The terminal can then transmit (or receive) a discovery signal at a frequency of interest to the ProSe action using the signaled transmission (or reception) resource pool parameters.

In this case, it may be when the terminal is interested in transmitting the discovery signal on the secondary carrier in the carrier aggregation. That is, the network can inform the terminal of the transmission resource pool parameter and the auxiliary information corresponding to the cell of another frequency with the dedicated signal for the terminal.

If a network (e.g., a base station) does not know the transmission resource pool parameter for a cell of another frequency that the terminal is interested in transmitting the discovery signal, the network cannot consider, in uplink scheduling, the discovery signal of the terminal at different frequency. Then, according to the principle of prioritizing cellular communication, when there is a conflict between the uplink transmission and the discovery signal transmission in the cellular communication, it is necessary to always drop the discovery signal transmission, thereby resulting in deterioration of announce signal transmission performance.

The terminal determines whether ProSe action is to be performed within cell coverage or outside cell coverage. The terminal can perform the determination by performing the measurement at a frequency that is of interest to perform the ProSe action.

The terminal acquires resource configuration and timing information of the ProSe action having interest. If the ProSe action is performed within the cell coverage, the terminal can acquire the resource configuration from the selected cell at the frequency at which the ProSe action is to be performed.

The resource configuration may include the following information.

1) Reception resource pool information. For example, 'commRxPool' included in SIB18 indicates a reception resource for ProSe communication, and 'discRxPool' included in SIB19 indicates reception resources for ProSe discovery.

2) The carrier frequency of the selected cell

3) Transmission resource pool information. For example, the 'commTxPoolNormalCommon' included in SIB18 indicates a transmission resource for ProSe communication, and the 'discTxPoolCommon' included in SIB19 indicates transmission resource for ProSe discovery.

4) Synchronization related parameters. For example, the 'commSyncConfig' included in SIB18, the 'discSyncConfig' included in SIB19, and so on.

5) Power control information. The 'DiscTxPowerInfo' included in SIB19.

Meanwhile, the frequency at which the terminal is interested in performing the ProSe action may be a non-serving frequency rather than a serving frequency.

If the ProSe action is performed within the cell coverage, the terminal acquires timing information of a selected cell at a frequency at which the ProSe action is to be performed.

The terminal computes the timing difference between the primary cell (Pcell) and the selected cell. The timing difference may be expressed as a frame offset or a subframe offset.

If the terminal is requested to report resource configurations for a plurality of cells or all cells of the frequency, the terminal acquires configuration information from the plurality of cells or all the cells. The network may instruct the terminal to report the cell to which the terminal reports the resource configuration.

If the ProSe action is performed outside the cell coverage, the terminal can acquire the resource configuration of the selected cell at the frequency at which the ProSe action is to be performed. The resource configuration of the cell may be as shown in the following table.

TABLE 4

| | |
|---|---|
| SL-Preconfiguration-r12 ::= | SEQUENCE { |
|     preconfigGeneral-r12 | SL-PreconfigGeneral-r12, |
|     preconfigSync-r12 | SL-PreconfigSync-r12, |
|     preconfigComm-r12 | SL-PreconfigCommPoolList4-r12, |
|     ... | |
| } | |
| | |
| SL-PreconfigGeneral-r12 ::= | SEQUENCE { |
|   -- PDCP configuration | |
|   rohc-Profiles-r12 | SEQUENCE { |
|     profile0x0001 | BOOLEAN, |
|     profile0x0002 | BOOLEAN, |
|     profile0x0004 | BOOLEAN, |
|     profile0x0006 | BOOLEAN, |
|     profile0x0101 | BOOLEAN, |
|     profile0x0102 | BOOLEAN, |
|     profile0x0104 | BOOLEAN |
|   }, | |
|   -- Physical configuration | |
|   carrierFreq-r12 | ARFCN-ValueEUTRA-r9, |
|   maxTxPower-r12 | P-Max, |
|   additionalSpectrumEmission-r12 | AdditionalSpectrumEmission, |
|   sl-bandwidth-r12 | ENUMERATED {n6, n15, n25, n50, n75, n100}, |
|   tdd-ConfigSL-r12 | TDD-ConfigSL-r12, |
|   reserved-r12 | BIT STRING (SIZE (19)), |
|   ... | |
| } | |
| | |
| SL-PreconfigSync-r12 ::= | SEQUENCE { |
|   syncCP-Len-r12 | SL-CP-Len-r12, |
|   syncOffsetIndicator1-r12 | SL-OffsetIndicatorSync-r12, |
|   syncOffsetIndicator2-r12 | SL-OffsetIndicatorSync-r12, |
|   syncTxParameters-r12 | P0-SL-r12, |
|   syncTxThreshOoC-r12 | RSRP-RangeSL3-r12, |
|   filterCoefficient-r12 | FilterCoefficient, |
|   syncRefMinHyst-r12 | ENUMERATED {dB0, dB3, dB6, dB9, dB12}, |
|   syncRefDiffHyst-r12 | ENUMERATED {dB0, dB3, dB6, dB9, dB12, dBinf}, |
|   ... | |
| } | |
| | |
| SL-PreconfigCommPoolList4-r12 ::= | SEQUENCE (SIZE (1..maxSL-TxPool-r12)) |
| OF SL-PreconfigCommPool-r12 | |
| | |
| SL-PreconfigCommPool-r12 ::= | SEQUENCE { |
| -- This IE is same as SL-CommResourcePool with rxParametersNCell absent | |
|   sc-CP-Len-r12 | SL-CP-Len-r12, |
|   sc-Period-r12 | SL-PeriodComm-r12, |
|   sc-TF-ResourceConfig-r12 | SL-TF-ResourceConfig-r12, |
|   sc-TxParameters-r12 | P0-SL-r12, |
|   data-CP-Len-r12 | SL-CP-Len-r12, |
|   data-TF-ResourceConfig-r12 | SL-TF-ResourceConfig-r12, |
|   dataHoppingConfig-r12 | SL-HoppingConfigComm-r12, |
|   dataTxParameters-r12 | P0-SL-r12, |
|   trpt-Subset-r12 | SL-TRPT-Subset-r12, |
|   ... | |
| } | |

The resource configuration in Table 4 may be included in the sidelink preconfiguration.

If the ProSe action to be performed by the terminal is performed outside the cell coverage of the frequency at which the ProSe action is to be performed, then the terminal acquires a timing difference between the primary cell and the frequency to perform the ProSe action.

The terminal can calculate the timing difference, and the timing difference is calculated based on the offset from the specific time of the primary cell, i.e., the frame offset calculated based on the specific frame number of the primary cell and the subframe number in the specific frame can be represented by the calculated sub-frame offset. The terminal considers the calculated timing of the frame offset and the calculated offset of the subframe at a frequency at which the ProSe action is to be performed to be a specific timing at a frequency at which a ProSe action is to be performed. For example, when the frame offset is 3 and the subframe offset is 4, the terminal considers the time point at which 3 radio frames and 4 subframes are delayed with reference to the time point when SFN=0 and subframe=0 in the primary cell as the time point at SFN=0 and subframe=0 of the ProSe operating frequency.

The terminal can report the acquired resource configuration to its serving cell.

In this case, the terminal can report only when the serving cell requests. The terminal may report the resource configuration in the sidelink terminal information.

Alternatively, the terminal may report the acquired resource configuration to its serving cell if its serving cell does not broadcast the acquired resource configuration. That is, if the terminal determines that the serving cell of the cell selected for the ProSe action does not know the resource configuration, the terminal reports the acquired resource configuration to its serving cell. This method is applicable when the ProSe action is performed within cell coverage.

Before reporting all acquired resource configurations, the terminal transmits a signal with a low signaling overhead to the serving cell, such as a flag, to acquire the resource configuration, and when the base station requests it, it informs the base station that the acquired resource configuration is to be reported.

The network may inform the terminal that it can support coordinated scheduling to report the ProSe action of the terminal.

On the other hand, it may be problematic to support transmission of a discovery signal in a non-serving cell or a secondary cell in an RRC state. Considering the continuity of the ProSe action of the terminal and the flexibility of the network configuration, it is desirable to support transmission of the discovery signal in the non-serving cell or the secondary cell, in both the RRC idle state and the RRC connected state.

<Proposal 1>

RAN2 may support transmitting a discovery signal in a non-serving cell or a secondary cell in both the RRC idle state and the RRC connected state.

The list of PLMNs for which ProSe discovery is allowed may be different from the list of PLMNs allowed for cellular action. Hereinafter, it is assumed that the discovery signal transmission (announcement) occurs only in the cell of the PLMN to which the discovery signal transmission is applied.

<Proposal 2>

In the transmission of a ProSe discovery signal in a non-serving cell and/or a secondary cell, the cells are confined to cells belonging to the PLMN to which the ProSe discovery signal transmission is granted.

In the LTE-A Rel-12, reception of the ProSe discovery signal in a non-serving cell at a frequency other than the serving frequency is not prevented.

The terminal in the RRC idle state is camping on cell 1 at frequency 1 and the terminal is interested in discovering signals in cell 2 at frequency 2 (i. E., Found in cell 2 at frequency 2) Suppose you want to perform signaling (announcement).

In this case, there are two approaches to support this proposal.

The first method is for the terminal to change the primary cell through the modified frequency-to-frequency cell reselection and to perform the discovery signal transmission in the new primary cell.

The second method is to perform discovery signal transmission in a cell located at a frequency other than the frequency of the primary cell.

The first method is a full-scale method based on LTE-A Rel-12 that discovery signal transmission is allowed only in the primary cell. The terminal may need to be allowed to perform frequency prioritization to change/select a cell that is located at a frequency other than the current serving frequency to support the discovery signal transmission to a new primary cell. The first method is simple and requires very little improvement. For example, by allowing frequency prioritization, the first method is fully feasible. However, according to the first method, when there is a plurality of frequencies supporting the discovery signal transmission, the frequency that the terminal should select for transmitting the discovery signal cannot be controlled from the network side, and most of the disadvantages are left to the terminal. That is, the rate at which the terminals are camped-up for the discovery signal transmission among the plurality of frequencies will be determined at random, and thus is far from efficient control. In addition, the first method has a problem that the capability of the terminal cannot be utilized even if there is a terminal capable of simultaneously transmitting the cellular communication and the discovery signal.

The second method is to remove the limitations of LTE-A Rel-12 as described in the first method. That is, in the idle period of the current primary cell, the terminal can perform the discovery signal transmission (announcement) in a cell other than the primary cell (hereinafter, non-primary cell).

In the case of a terminal that cannot simultaneously transmit cellular communication and discovery signal, if the discovery signal transmission is performed in a non-primary cell without enhancement, the performance will be worse than that of the discovery signal in the primary cell It is expected. The reason is that 1) the current primary cell does not know which cell/which frequency the terminal is interested in transmitting the discovery signal. 2) In addition, the current primary cell does not know the exact timing of the opportunity to transmit the discovery signal in the cell. Thus, without the improvements described in the present invention, the network will not be able to do any action to coordinate the uplink transmission scheduling of the terminal so that the cellular communication and the discovery signal transmission do not collide.

In view of the above mentioned, it is desirable to base the second method on the camping action of the terminal in the RRC idle state. In LTE-A Rel-12, signal transmission according to ProSe communication in a non-serving cell or a secondary cell is already supported. According to the second method, it has a unity in the action of the terminal in signal transmission depending on the ProSe communication and transmission of the ProSe discovery signal.

<Proposal 3>

Suppose that the terminal in the RRC idle state is camping on cell 1 at a frequency 1 and the terminal is interested in discovering signals in a cell 2 at a frequency 2 (i. e., the discovery signal transmission (announcement) is to be performed in the cell 2 at the frequency 2). In this case, it is proposed to use the above mentioned second method described above. That is, it is proposed to allow the discovery signal transmission in non-primary cells.

The first method described above also has a clear advantage for a terminal that cannot simultaneously transmit cellular communication and discovery signal. If cell reselection to another cell, for example a cell with a lower priority, is allowed, the terminal may avoid frequent radio frequency (RF) retuning.

<Proposal 4>

The first method described above can also be supported.

In order to support both of the above two methods, the following is confirmed.

1) Supply of a transmission resource pool corresponding (or applicable) to a non-primary cell 2) Frequency Prioritization <Supply of Transmission Resource Pool Corresponding to Non-Primary Cell>

If there is no assistance information for the discovery signal transmission in the non-serving cell, the terminal will need to acquire SIB19 from the non-serving cell. In order to acquire SIB19, and in order to acquire the SIB19, it is necessary to previously acquire MIB, SIB1 or the like.

In order to avoid such an ineffective terminal action, the serving cell may provide the terminal with discovery signal transmission setup information applicable as non-primary or non-serving cells as auxiliary information.

For example, the supplementary information may include the CP length, the transmission period of the discovery signal, the number of retransmissions, the number of repetitions, the transmission resource configuration (including transmission resource pool information), transmission parameters or the like, and this various information may be defined in the 'SL-DiscResourcePool'.

<Proposal 5>

The cell may signal through the SIB19 transmission resource pool parameters corresponding to other cells of different frequencies.

Transmission resource allocation of non-primary cells may require RSRP-based resource pool selection. The terminal may then need to know the measurement bandwidth to comply with the resource pool selection based on the RSRP measurement of the cell.

As long as the reselection frequency information includes a frequency at which the terminal is interested in the discovery signal transmission, the terminal can know the measurement band of the cell from the SIB15 of the primary cell. However, if the frequency with which the terminal is interested in the discovery signal transmission is not included in the reselected frequency information, information on the measurement bandwidth should be provided to the terminal. Considering this, it is desirable to inform the measured bandwidth through SIB19 for frequencies not included in the reselected frequency information.

<Proposal 6>

The cell can signal auxiliary information, including measurement bandwidth, via SIB19. The measurement bandwidth may be for a cell of a frequency at which the terminal is interested in transmitting the discovery signal.

In order to support the discovery signal transmission in the non-primary cell, the terminal may first need to select the cell to use for discovery signal transmission.

In this case, rules applied to ProSe communication can be applied.

The measurements needed to select the cell to use for the discovery signal transmission may also be used to perform RSRP-based transmission resource pool selection that should be performed to transmit the discovery signal in the non-primary cell.

The terminal may need to perform measurements on the cell. At this time, depending on the current measurement requirements, it may not be required to perform a measurement for a cell with a lower priority than the primary cell. Without additional measurements beyond the current requirements, the discovery signal transmission in non-primary cells will be often delayed.

<Proposal 7>

If a terminal in the RRC idle state is interested in transmitting the discovery signal in a non-primary cell, measurements may be performed on the non-primary cell regardless of the priority of the frequency of the non-primary cell.

<Proposal 8>

Additional measurements defined for ProSe communication may also be applied to measurements on the frequency of non-primary cells. In this case, the frequency is a frequency of the non-primary cell in which the terminal is interested in transmitting the Prose discovery signal.

<Proposal 9>

When receiving the transmission resource pool parameters and the auxiliary information of the non-primary cell, the terminal may use the transmission resource pool parameters and the auxiliary information without identifying the MIB, SIB1, SIB19, or the like, to transmit the discovery signal in the non-primary cell.

<Frequency Prioritization>

<Proposal 10>

The terminal may be allowed to perform frequency prioritization for the purpose of discovery signal transmission (announcement). That is, the frequency of the non-primary cell or the non-serving cell to which the detection signal is to be transmitted is regarded as the highest frequency priority.

<Proposal 11>

Frequency prioritization may only be allowed if the terminal is allowed to camp on a cell of a prioritized frequency.

<Proposal 12>

Frequency prioritization may only be allowed for frequencies belonging to the EPLMN/HPLMN among the frequencies belonging to the PLMN to which the ProSe discover signal transmission is applied.

The following three scenarios can be considered for transmitting (discovery) the discovery signal in the RRC connection state.

1) Transmit the discovery signal in a primary cell
2) Transmit the discovery signal in a secondary cell
3) Transmit the discovery signal in a non-serving cell (i.e., transmit the discovery signal in a cell at another frequency)

The first scenario is supported in LTE-A Rel-12. Therefore, the present invention will focus on the second and third scenarios.

First, it may be a question of whether the terminal, which has already set the secondary cell, is allowed to transmit the discovery signal in the non-secondary cell that is not the secondary cell at the frequency to which the secondary cell belongs. If it is allowed, it will interfere with the uplink transmission in the secondary cell, so it is not preferable to transmit the discovery signal in the non-secondary cell positioned at the frequency to which the secondary cell belongs.

<Proposal 13>

When transmitting the discovery signal at the serving frequency, the terminal may be allowed to transmit the discovery signal only in the serving cell (either the primary cell or the secondary cell).

When transmitting a discovery signal at a non-serving frequency, it may be questionable whether to allow sending a discovery signal in a best-ranking cell of the non-serving frequency.

With respect to the ProSe communication, it may be desirable to use the best-ranking cell of the non-serving frequency in transmitting the discovery signal at the non-serving frequency. Then, the following requirements may be required.

<Proposal 14>

If the terminal in the RRC connected state is interested in transmitting the discovery signal in the non-serving cell, the terminal may measure the frequency of the non-serving cell even if the frequency of the non-serving cell is not configured to a measurement object.

<Proposal 15>

Additional measurements defined for the ProSe communication may also be applied to the measurement of the frequency of non-primary cells where the terminal in RRC connection is interested in the discovery signal transmission.

<Proposal 16>

Additional measurements defined for ProSe communication can also be applied to measurements on the frequency of non-primary cells.

When the terminal enters the RRC connection state, the terminal can inform that it is interested in reception, transmission, or transmission/reception of the detection signal by transmitting the sidelink terminal information.

The terminal may be interested in transmitting discovery signals in a particular secondary cell. In this case, the terminal may transmit the index of the secondary cell (serving cell) in the transmission resource request or inform the frequency of the serving cell. The terminal may be interested in transmitting discovery signals in non-serving cells of frequencies other than the serving frequency. In this case, the terminal can inform the carrier frequency of the target non-serving cell. In the two cases described above, if the difference in amplitude of signals transmitted from the terminal to the network is not large, then it is desirable to transmit a common format signal.

<Proposal 17>

The terminal can transmit to the sidelink terminal information including a list of frequencies that the terminal is interested in transmitting the detection signal. The frequencies included in the list may be a serving frequency or a non-serving frequency.

<Proposal 18>

The terminal can inform the network of the list of frequencies that are interested in transmitting the discovery signal through the sidelink terminal information.

The limitation of transmitting the discovery signal only in the primary cell or the secondary cell of the serving frequency can also be applied to the triggering of the sidelink terminal information.

The terminal may be interested in transmitting the discovery signal in a particular secondary cell. In this case, the terminal can inform the network by transmitting the index of the secondary cell (serving cell) in the transmission resource request, thereby informing the network or transmitting the frequency of the serving cell, thereby informing the network. The terminal may be interested in transmitting the discovery signal in the non-serving cell. In this case, the terminal can inform the network of its interest by notifying the frequency (carrier frequency) of the non-serving cell. In the two cases described above, if the difference in size of signals transmitted from the terminal to the network is not large, then it is desirable to transmit a common format signal.

<Proposal 20>

The terminal can inform the list of frequencies that it is interested in transmitting the discovery signal (i.e., announcement) through the sidelink terminal information.

If the base station knows transmission resource pool parameters for a cell of a frequency that the terminal is interested in transmitting a discovery signal, the base station may signal the transmission resource pool parameters to the terminal. In this case, the terminal can transmit a discovery signal at a different frequency using the transmission resource pool parameter. This is the case when the terminal is interested in transmitting the discovery signal on the secondary carrier.

<Proposal 21>

The cell may inform the terminal of the transmission resource pool parameters and the auxiliary information corresponding to other cells of different frequencies through dedicated signaling to the terminal.

When the terminal does not know the transmission resource pool parameter for cells of other frequencies that are interested in the discovery signal transmission, the base station cannot consider the discovery signal transmission at the different frequency in the UL scheduling for the terminal. In this case, whenever the uplink scheduling by the cellular communication overlaps with the discovery signal transmission, the terminal may need to drop the discovery signal transmission based on the principle of prioritizing cellular communication. However, when this action is performed, the performance of the D2D discovery action at the different frequency will be degraded.

One solution to this is to allow the terminal to report to the network the transmission resource pool parameters for the cells of frequency that is interested in the discovery signal transmission.

For example, suppose that the serving cell of the terminal is cell 1 of frequency 1 and the terminal desires to transmit a discover signal in cell 2 of frequency 2. In this case, if the terminal determines that the cell 1 does not know a transmission resource pool (or a parameter for configuring the transmission resource pool) for transmission of the discovery signal in the cell 2, and reports to the cell 1 the transmission resource pool for the discovery signal transmission in the cell 2. When requesting the resource for transmitting the discovery signal to the cell 1, the terminal can transmit the sidelink terminal information.

<Proposal 22>

The terminal may report transmission resource pool parameters for cells of frequencies other than its serving frequency to its serving cell. The transmission resource pool parameter may be a parameter for transmitting the discovery signal for the cell of the different frequency. In addition, the terminal may report the timing information together with the transmission resource pool parameters.

<Capability of Terminal>

Currently, the terminal only indicates the frequency band that supports the discovery action to the base station, and does not provide information on other information, for example, information on simultaneous execution of cellular communication and D2D action and the like. As for this conventional action, it was not a problem in LTE-A Rel-12 in which discovery signal transmission is performed only in the primary cell. However, in order to support the discovery signal transmission at the secondary frequency or the non-serving frequency, this conventional action alone is not enough. For example, according to the conventional action, the base station cannot know whether to restrict the uplink transmission by the cellular communication in order to assist the transmission of the discovery signal at another frequency.

With respect to the base station, it may be important to know whether the terminal supports simultaneous transmissions in a combination of bands that perform signal transmission by cellular communication and discovery signal transmission.

<Proposal 23>

The terminal can signal to the network whether the simultaneous action is possible in the combination of bands in which it performs the signal transmission by the cellular communication and the discovery signal transmission to be included in its capability information.

Hereinafter, when the terminal desires to perform a sidelink action, for example, a discovery signal transmission in a cell other than its serving cell (which may be at a frequency other than the serving frequency), it will be described that which information on the other cell can be reported to its serving cell, or which function it should have for this action, and so on. For convenience of explanation, the other cell will be referred to as a neighboring cell.

In order for the terminal to report to the serving cell the configuration for the ProSe action of the neighboring cell (e.g., a configuration for discovery signal transmission, hereinafter it will be an example for convenience), the network (serving cell) can configure the frequency to acquire and report the configuration for transmitting a discovery signal to the terminal.

If the report is configured, the terminal can acquire and report a configuration for transmitting the discovery signal of the neighboring cell within a predetermined time period (indicated by a timer).

The discovery action configuration of the neighboring cell can be acquired through the SIB (e.g., SIB19) transmitted by the neighboring cell.

The following information may be included in the discovery action configuration of the neighboring cell reported by the terminal. 1) Cell ID information such as a cell ID and a PLMN ID; 2) a resource pool configuration for the discovery action; 3) a synchronization configuration of the neighboring cell; 4) a timing difference between the serving cell and the neighboring cell; 5) information indicating whether the neighboring cell provide a resource configuration applicable to a terminal serving as a repeater (the terminal serving as a repeater means a terminal between a first terminal and a network, and a terminal serving as a relay between network nodes such as a second terminal between a first terminal and a third terminal).

Figure 19:
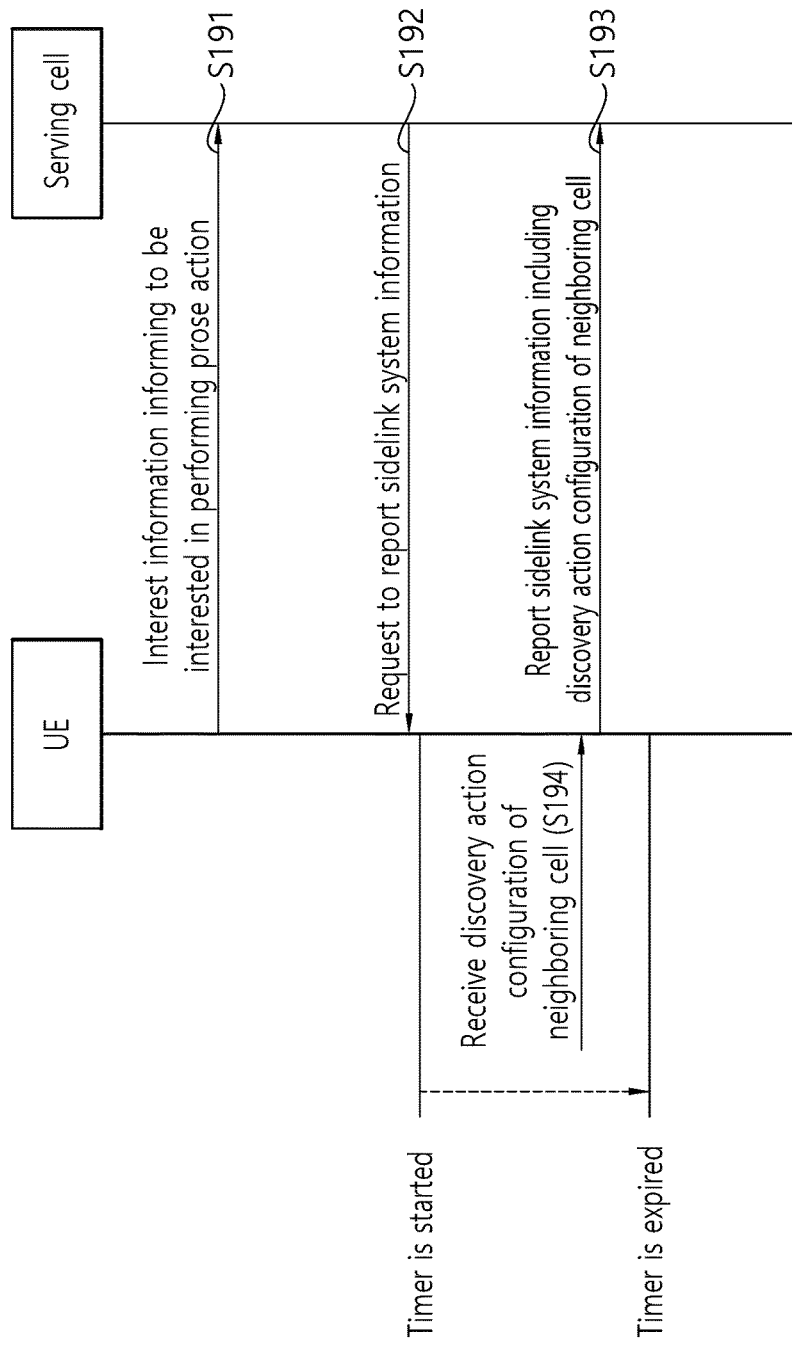
FIG. 19 shows a method of reporting a discovery action configuration of a neighboring cell according to an embodiment of the present invention.

FIG. 19 shows a method of reporting a discovery action configuration of a neighboring cell according to an embodiment of the present invention.

The terminal transmits interest information indicating that it is interested in performing the discovery action to the serving cell (S191). The interest information may be information indicating that the terminal is interested in the discovery signal transmission at a specific frequency.

The serving cell may request the terminal to report the sidelink system information (S192). The terminal may receive the sidelink system information report request from the serving cell positioned at the first frequency. The sidelink system information report request may be a message requesting to report system information associated with the sidelink action acquired from another cell of the second frequency. This message may indicate to the terminal to which the sidelink system information for the cell with which frequency is to be reported. That is, the terminal can be informed of the frequency subject to the sidelink system information report. The first frequency and the second frequency may be different frequencies. The sidelink action may be a discovery action. The serving cell may indicate the cell identifier to the terminal along with the frequency to which the system information report is subject. The base station may instruct the terminal to report the sidelink system information when transmitting the discovery configuration information that permits performing the discovery action to the terminal in response to the Interest information message transmitted by the terminal. For example, information indicating that the sidelink system information should be reported may be included in the discovery configuration information.

The terminal receives the discovery configuration information that allows the discovery action to be performed and performs the discovery action. In this process, the terminal acquires the sidelink system information (here, sidelink discovery related system information) at a frequency on which the terminal desires to perform the discovery action. In response to requesting to report sidelink system information, the terminal may report to the serving cell sidelink terminal information including system information associated with a sidelink action acquired from another cell of the second frequency. That is, the sidelink terminal information including the sidelink system information report ('SL-SysInfoReport') can be reported.

The sidelink system information report ('SL-SysInfoReport') may include parameters associated with the sidelink action acquired from the system information of inter-frequency cells. That is, the terminal can inform the serving cell of the configuration on the sidelink action (for example, discovery signal transmission/reception) acquired from the system information of the inter-frequency cells through the system information report. Here, the inter-frequency cell may mean a cell of frequency f2 in a situation where the terminal has cell 1 of frequency f1 as a serving cell.

The following table shows an example of the sidelink system information report ('SL-SysInfoReport').

TABLE 5

-- ASN1START
SL-SysInfoReport-r13 ::=          SEQUENCE {
    plmn-IdentityList-r13         PLMN-IdentityList       OPTIONAL,
    cellIdentity-13               CellIdentity            OPTIONAL,
    carrierFreqInfo-13            ARFCN-ValueEUTRA-r9
    OPTIONAL, TABLE 5-continued

```
discRxResources-r13            SL-DiscRxPoolList-r12       OPTIONAL,
discTxPoolCommon-r13           SL-DiscTxPoolList-r12       OPTIONAL,
discTxPowerInfo-r13            SL-DiscTxPowerInfoList-r12  OPTIONAL,
discSyncConfig-r13             SEQUENCE {
    asyncParameters-r13                                    SEQUENCE {
        syncCP-Len-r13              SL-CP-Len-r12,
        syncOffsetIndicator-r13     SL-OffsetIndicatorSync-r12,
        slssid-r13                  SLSSID-r12
    }
                                    OPTIONAL,
    txParameters-r13                                       SEQUENCE {
        syncTxParameters-r13        SL-TxParameters-r12,
        syncTxThreshIC-r13          RSRP-RangeSL-r12,
        syncInfoReserved-r13        BIT STRING (SIZE (19))
OPTIONAL,
        syncTxPeriodic-r13          ENUMERATED {true}      OPTIONAL
    }
                                    OPTIONAL
}
                                    OPTIONAL,
cellSelectionInfo-r13               SEQUENCE {
    q-RxLevMin-r13                  Q-RxLevMin,
    q-RxLevMinOffset-r13            INTEGER (1..8)
OPTIONAL
}                  OPTIONAL,
q-Hyst-r13                          ENUMERATED {
                                    dB0, dB1, dB2, dB3, dB4, dB5, dB6, dB8, dB10,
                                    dB12, dB14, dB16, dB18, dB20, dB22, dB24}
                                    OPTIONAL,
q-RxLevMin-r13                      Q-RxLevMin         OPTIONAL,
t-ReselectionEUTRA-r13              T-Reselection      OPTIONAL,
tdd-Config-r13                      TDD-Config         OPTIONAL,
freqInfo-r13                        SEQUENCE {
    ul-CarrierFreq-r13              ARFCN-ValueEUTRA                OPTIONAL,
    ul-Bandwidth-r13                ENUMERATED {n6, n15, n25, n50, n75, n100}
                                    OPTIONAL,
    additionalSpectrumEmission-r13  AdditionalSpectrumEmission
OPTIONAL
}
                                    OPTIONAL,
p-Max-r13                           P-Max              OPTIONAL,
referenceSignalPower-r13            INTEGER (-60..50)  OPTIONAL
}
-- ASN1STOP
```

In the above table, 'plmn-IdentityList' is a list of PLMN IDs of cells in which the terminal acquires system information associated with the discovery action. For example, suppose a terminal has a cell 1 of frequency f1 as a serving cell. Assume that the cell 1 is included in PLMN 1. If the system information associated with the discovery action is acquired from a cell 2 of frequency f2, and the cell 2 is included in the PLMN 2, then an ID of the PLMN 2 is included in the 'plmn-IdentityList'. The 'cellIdentity' indicates the ID of the cell from which system information associated with the discovery action is acquired. In the above example, the cell ID of the cell 2 (an arbitrary ID that can identify the cell 2 such as a physical cell ID or a global cell ID) is included in 'cellIdentity'. The 'SL-CarrierFreqInfo' indicates the frequency of the cell from which the system information associated with the discovery action is acquired. In the above example, 'SL-CarrierFreqInfo' may include information indicating the second frequency on which the cell 2 is located. Meanwhile, in the above example, only one cell of the second frequency is illustrated, as a matter of course, the PLMN ID, the cell ID, and the frequency of the plurality of cells of the second frequency may be included in the sidelink system information report.

The System information associated with the discovery action may be, for example, SIB19. The following table shows a part of the SIB19.

TABLE 6

```
-- ASN1START
SystemInfomationBlockType19-r12 ::= SEQUENCE {
    discConfig-r12                                          SEQUENCE {
        discRxPool-r12              SL-DiscRxPoolList-r12,
        discTxPoolCommon-r12        SL-DiscTxPoolList-r12          OPTIONAL,   -- Need OR
        discTxPowerInfo-r12         SL-DiscTxPowerInfoList-r12 OPTIONAL,       --
Cond Tx
        discSyncConfig-r12          SL-SyncConfigList-r12          OPTIONAL    -- Need OR
    }
                                                                   OPTIONAL,   -- Need OR
    discInterFreqList-r12           SL-CarrierFreqInfoList-r12     OPTIONAL,   -- Need OR
    lateNonCriticalExtension                    OCTET STRING                   OPTIONAL,
    ...,
```

TABLE 6-continued

```
    [[      discConfig-v13x0                                    SEQUENCE {
            discInterFreqList-v13x0    SL-CarrierFreqInfoList-v13x0           OPTIONAL,-- Need
OR
                gapRequestsAllowedCommon                ENUMERATED {true}OPTIONAL-
- Need OR
            }
                                                                OPTIONAL,      -- Need OR
            discConfigRelay-r13                                 SEQUENCE {
            discThreshHiRelayUE-r13    RSRP-Range                              OPTIONAL, --
Need OR
            discThreshLoRelayUE-r13    RSRP-Range                              OPTIONAL, --
Need OR
            discHystMaxRelayUE-r13                             ENUMERATED {dB0, dB3, dB6,
dB9, dB12, dBinf},
            discHystMinRelayUE-r13                             ENUMERATED {dB0, dB3, dB6,
dB9, dB12},
                    -- Uu threshold
            discThreshHiRemoteUE-r13   RSRP-Range                  OPTIONAL,   -- Need OR
                discHystMaxRemoteUE-r13                        ENUMERATED {dB0, dB3, dB6,
dB9, dB12},
                    -- Uu threshold
                reselectionInfoRemoteUE-IC-r13                 ReselectionInfoRelay-r13
            }
                                                                OPTIONAL,     -- Need OR
            discConfigPS-13                                     SEQUENCE {
            discRxPoolPS-r13                                    SL-DiscRxPoolList-r12,
            discTxPoolPS-Common-r13                             SL-DiscTxPoolList-r12
    OPTIONAL        -- Need OR
            }
                                                                OPTIONAL      -- Need OR
    ]]
}
SL-CarrierFreqInfoList-r12 ::=      SEQUENCE (SIZE (1..maxFreq)) OF SL-CarrierFreqInfo-r12
SL-CarrierFreqInfoList-v13x0 ::=            SEQUENCE (SIZE (1..maxFreq)) OF SL-
CarrierFreqInfo-v13x0
SL-CarrierFreqInfo-r12::=                   SEQUENCE {
    carrierFreq-r12                                         ARFCN-ValueEUTRA-r9,
    plmn-IdentityList-r12                   PLMN-IdentityList4-r12
    OPTIONAL        -- Need OP
}
...
CellSelectionInfoNFreq-r13 ::=      SEQUENCE {
    -- Cell selection information as in SIB1
    q-RxLevMin-r13                                          Q-RxLevMin,
    q-RxLevMinOffset           INTEGER (1..8)                               OPTIONAL, --
Need OP
    -- Cell re-selection information as in SIB3
    q-Hyst-r13                          ENUMERATED {
            dB0, dB1, dB2, dB3, dB4, dB5, dB6, dB8, dB10,
            dB12, dB14, dB16, dB18, dB20, dB22, dB24},
    q-RxLevMinReselection-r13                   Q-RxLevMin          OPTIONAL,   -- Need OP
    t-ReselectionEUTRA-r13                                  T-Reselection
}
SL-CarrierFreqInfo-v13x0::=          SEQUENCE {
    discRxResources-r13        SL-DiscRxPoolList-r12           OPTIONAL,        -- Need OR
    discRxResourcesPS-r13      SL-DiscRxPoolList-r12           OPTIONAL,        -- Need OR
    discTxResources-r13        SL-DiscTxResourcesInterFreq-r13                 OPTIONAL, --
Need OR
    discTxResourcesPS-r13      SL-DiscTxResourcesInterFreq-r13                 OPTIONAL, --
Need OR
    discTxPowerInfo-r13        SL-DiscTxPowerInfoList-r12      OPTIONAL,        -- CondTx
    discTxRefCarrierCommon-r13 ENUMERATED {pCell}                              OPTIONAL, --
Need OR
    discSyncConfig-r13         SL-SyncConfigListNFreq-r12      OPTIONAL,        -- Need OR
    cellSelectionInfo-r13      CellSelectionInfoNFreq-r13      OPTIONAL         -- Need OR
}
PLMN-IdentityList4-r12 ::= SEQUENCE (SIZE (1..maxPLMN-r11)) OF PLMN-
IdentityInfo2-r12
PLMN-IdentityInfo2-r12 ::=                  CHOICE       {
    plmn-Index-r12                                          INTEGER (1..maxPLMN-r11),
    plmnIdentity-r12                                        PLMN-Identity
}
SL-DiscTxResourcesInterFreq-r13 ::=         CHOICE {
    acquireSI-FromCarrier-r13               NULL,
    discTxPoolCommon-r13                    SL-DiscTxPoolList-r12,
    requestDedicated-r13                    NULL,
    noTxOnCarrier-r13                                       NULL
}
```

For example, in the above table, the 'discTxPoolcommon' indicates a resource that the terminal is allowed to announce in the RRC idle state, and 'discRxPool' indicates the resource for which the RRC idle and the terminal in the RRC connection state are allowed to receive the discovery signal. The terminal can acquire the SIB19 from the neighboring cell.

Upon receiving the configuration indicating the report of the sidelink system information, the terminal starts a timer, receives the discovery action configuration of the neighboring cell within the time period in which the timer operates, and reports the discovery action configuration (S193). The timer will be described in below.

The sidelink system information report including the discovery action configuration of the neighboring cell is transmitted to the serving cell, prior to the timer expiration (S193). The sidelink system information may be included in the sidelink terminal information or transmitted separately. In the present embodiment, the sidelink system information is transmitted to be included in the sidelink terminal information. That is, the terminal transmits the sidelink terminal information including the sidelink system information to the serving cell.

Now, the timer and the terminal action associate therewith will be described in detail. The timer may, for example, operate as follows.

TABLE 7

| Timer | Start | Stop | At expiry |
|---|---|---|---|
| T370 | It is started when receiving a message ('discSysInfoReportConfig') requesting to start the sidelink terminal information process to report the system information acquired in the inter-frequency discovery process | It is stopped when the process of transmitting the sidelink terminal information to transmit the sidelink system information is started. | Release 'discSysInfoReportConfig' |

According to the above table, the timer may be started, when receiving the sidelink system information report request and it may be stopped, when initiating the process of transmitting the sidelink terminal information including the sidelink system information report. When the timer expires, the terminal may stop acquiring the system information associated with the sidelink action from other cells of the second frequency. In addition, when the timer expires, the terminal may itself remove the sidelink system reporting configuration (e.g., discSysInfoReportConfig). The value of the timer may be configured to, for example, 60 seconds.

Meanwhile, the terminal can support reporting of the discovery action configuration of the neighboring cell when a specific event occurs. That is, it can support that an action of reporting a discovery action configuration of a neighboring cell by a specific event is triggered.

Figure 20:
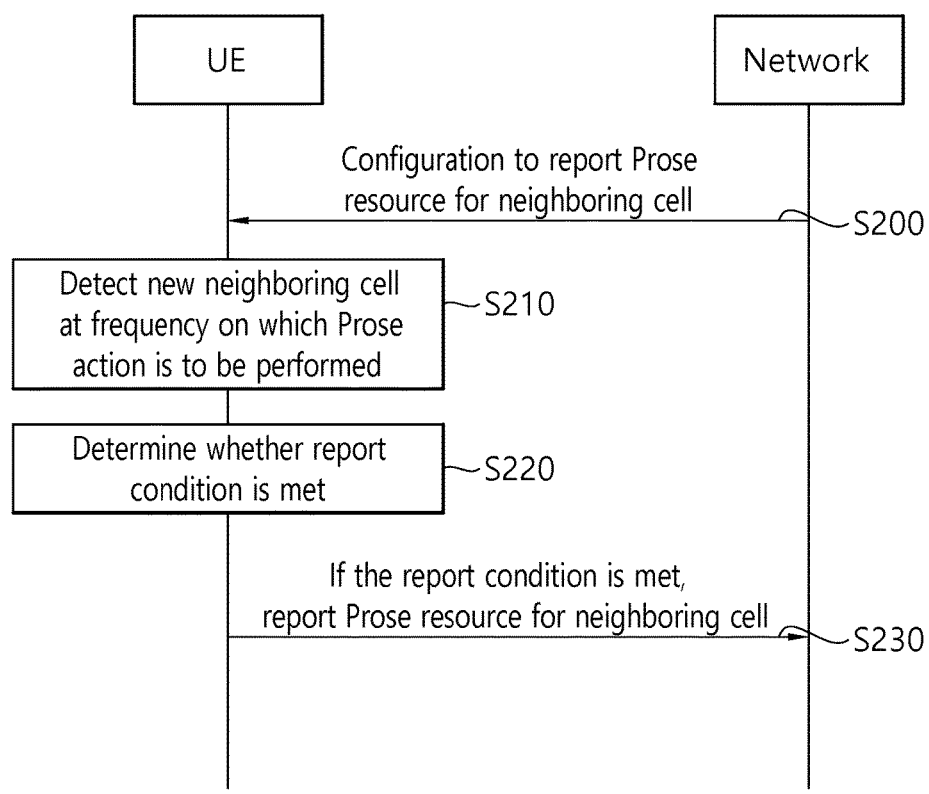
FIG. 20 shows a method of reporting ProSe resource for a neighboring cell performed by the terminal.

FIG. 20 shows a method of reporting ProSe resource for a neighboring cell performed by the terminal.

Referring to FIG. 20, the terminal receives a configuration for reporting a ProSe resource for the neighboring cell from a serving cell (S200). The configuration may inform the terminal of in which case the condition of the ProSe resource report for the neighboring cell positioned at a specific frequency.

For example, according to the above configuration, when the terminal detects a new neighbor cell at a frequency (interesting) to which a ProSe action is to be performed, the terminal receives the configuration for the discovery action provided by the new neighboring cell through the SIB and reports it to the serving cell.

The network may configure a threshold for the terminal to report the configuration for the discovery action of neighboring cell by the above configuration. When the threshold value is configured, the terminal can report the configuration for the discovery action of the neighboring cell to the serving cell only when the signal quality/intensity of the detected neighboring cell becomes equal to or greater than the threshold value.

The terminal can detect a new neighboring cell at a frequency on which the ProSe action is to be performed (S210).

The terminal determines whether the report condition is met by the configuration (S220), if the report condition is met, then the terminal reports the ProSe resource for the neighboring cell to the serving cell (S230).

If the neighboring cell detected by the terminal does not provide the configuration for the discovery action through the SIB, then the terminal can inform the serving cell that the detected neighboring cell does not provide a configuration for the discovery action.

If the terminal fails to detect any neighboring cell (regular cell) at the frequency configured by the network, the terminal can inform the serving cell that there is no neighboring cell at the configured frequency.

Meanwhile, when a change occurs in the ProSe resource of the neighboring cell, the terminal can perform the updated ProSe resource report by reflecting the change. For example, if the neighboring cell detects that the configuration for the discovery action by the SIB that has been previously sent is changed to the configuration for the new discovery action, the terminal can report the change to the serving cell. To this end, the terminal needs to monitor the SIB of the neighboring cell.

Meanwhile, the terminal can periodically perform the ProSe resource reporting for the neighboring cells to perform updated reporting reflecting the change when the ProSe resource configuration of the neighboring cell is changed.

Figure 21:
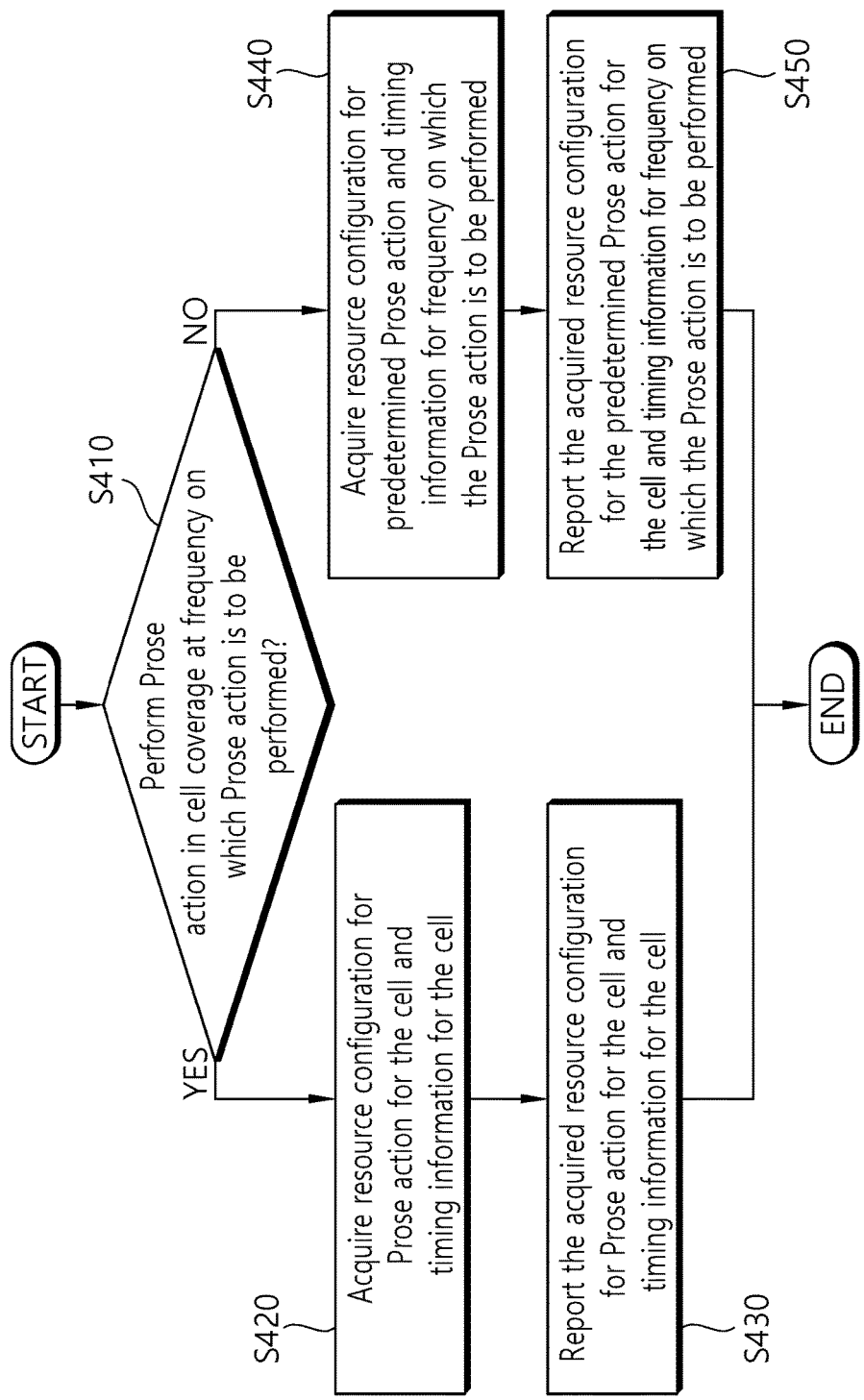
FIG. 21 shows another example of a method of reporting the ProSe resource for a neighboring cell performed by the terminal.

FIG. 21 shows another example of a method of reporting the ProSe resource for a neighboring cell performed by the terminal.

The terminal may determine whether the ProSe action is performed within the cell coverage at the frequency on which the ProSe action is to be performed (S410). If the terminal having the f1 frequency as a serving frequency and the cell 1 as a serving cell is interested in performing ProSe action on the f2 frequency, then a measurement is performed on the f2 frequency, and thus it can evaluate whether there is a proper cell to perform the ProSe action. Suppose that there are several cells in the frequency 12, and the cell 2 is selected for ProSe action. That is, suppose that the cell 2 of the 12 frequency performs the discovery signal transmission. In this case, the terminal can determine that the ProSe action is to be performed within the cell coverage.

If the ProSe action is determined to be performed within the cell coverage, then the terminal can acquire the resource configuration for the ProSe action of the cell (cell 2) and the timing information for the cell (cell 2) (S420).

The resource configuration for ProSe action includes at least one of 1) reception resource pool information (e.g., 'commRxPool' included in SIB18 or 'discRxPool' included in SIB19), 2) the carrier frequency of the cell (cell 2), 3) the transmission resource pool information (e.g., 'commTx-PoolNormalCommon' included in SIB18 or 'discTxPool-common' included in SIB19), 4) synchronization related parameters (e.g., 'commSyncConfig' included in SIB18 or 'discSyncConfig' included in SIB19), and 5) power control information (e.g., 'discTxPowerinfo' included in SIB19).

If the ProSe action is determined to be performed within the cell coverage, then the terminal acquires timing information for the cell (cell 2). The terminal calculates the timing difference between the primary cell and the cell 2. The timing difference may be expressed as a frame offset or a subframe offset.

The terminal reports the resource configuration for the ProSe action for the cell (cell 2) and the timing information for the cell to the serving cell (S430).

In FIG. 21, it is described that only one cell at f2 frequency is selected and the ProSe resource configuration and timing information provided by the corresponding cell (cell 2) is reported to the serving cell, but it is not limited thereto. That is, it is available to report all of the ProSe resource configuration and timing information provided by two or more of the plurality of cells or each of the plurality of cells in the frequency f2. In addition, the network may configure the terminal to which ProSe resource configuration and timing information for a specific cell should be reported at frequency 12.

Meanwhile, if it is determined that the ProSe action is performed out of the cell coverage at the frequency on which the ProSe action is to be performed, then the terminal acquires resource configuration (referred to as SL-Preconfiguration) for a predetermined ProSe action and acquires timing information for the frequency on which the ProSe action is to be performed (S440).

The following table is an example of SL-Preconfiguration.

TABLE 8

| | |
|---|---|
| SL-Preconfiguration-r12 ::= | SEQUENCE { |
| - preconfigGeneral-r12 | SL-PreconfigGeneral-r12, |
| - preconfigSync-r12 | SL-PreconfigSync-r12, |
| - preconfigComm-r12 | SL-PreconfigCommPoolList4-r12, |
| - ... | |
| - } | |
| | |
| - SL-PreconfigGeneral-r12 ::= | SEQUENCE { |
| - -- PDCP configuration | |
| - rohc-Profiles-r12 | SEQUENCE { |
| - profile0x0001 | BOOLEAN, |
| - profile0x0002 | BOOLEAN, |
| - profile0x0004 | BOOLEAN, |
| - profile0x0006 | BOOLEAN, |
| - profile0x0101 | BOOLEAN, |
| - profile0x0102 | BOOLEAN, |
| - profile0x0104 | BOOLEAN |
| - }, | |
| - -- Physical configuration | |
| - carrierFreq-r12 | ARFCN-ValueEUTRA-r9, |
| - maxTxPower-r12 | P-Max, |
| - additionalSpectrumEmission-r12 | AdditionalSpectrumEmission, |
| - sl-bandwidth-r12 | ENUMERATED {n6, n15, n25, n50, n75, n100}, |
| - tdd-ConfigSL-r12 | TDD-ConfigSL-r12, |
| - reserved-r12 | BIT STRING (SIZE (19)), |
| - ... | |
| - } | |
| | |
| - SL-PreconfigSync-r12 ::= | SEQUENCE { |
| - syncCP-Len-r12 | SL-CP-Len-r12, |
| - syncOffsetIndicator1-r12 | SL-OffsetIndicatorSync-r12, |
| - syncOffsetIndicator2-r12 | SL-OffsetIndicatorSync-r12, |
| - syncTxParameters-r12 | P0-SL-r12, |
| - syncTxThreshOoC-r12 | RSRP-RangeSL3-r12, |
| - filterCoefficient-r12 | FilterCoefficient, |
| - syncRefMinHyst-r12 | ENUMERATED {dB0, dB3, dB6, dB9, dB12}, |
| - syncRefDiffHyst-r12 | ENUMERATED {dB0, dB3, dB6, dB9, dB12, dBinf}, |
| - ... | |
| - } | |
| | |
| - SL-PreconfigCommPoolList4-r12 ::= | SEQUENCE (SIZE (1..maxSL-TxPool-r12)) OF SL-PreconfigCommPool-r12 |

TABLE 8-continued

```
- SL-PreconfigCommPool-r12 ::=        SEQUENCE {
- -- This IE is same as SL-CommResourcePool with rxParametersNCell absent
-     sc-CP-Len-r12                       SL-CP-Len-r12,
-     sc-Period-r12                       SL-PeriodComm-r12,
-     sc-TF-ResourceConfig-r12            SL-TF-ResourceConfig-r12,
-     sc-TxParameters-r12                 P0-SL-r12,
-     data-CP-Len-r12                     SL-CP-Len-r12,
-     data-TF-ResourceConfig-r12          SL-TF-ResourceConfig-r12,
-     dataHoppingConfig-r12               SL-HoppingConfigComm-r12,
-     dataTxParameters-r12                P0-SL-r12,
-     trpt-Subset-r12                     SL-TRPT-Subset-r12,
-     ...
}
```

The terminal calculates the timing difference between the frequency and the primary cell to perform the ProSe action, and the timing difference may be a frame offset or a subframe offset.

The terminal reports the previously acquired resource configuration for the predetermined ProSe action and the timing information on the frequency for performing the ProSe action to the serving cell (S450).

In steps S430 and S450, the terminal may perform the report in response to a request from the network. The terminal may transmit the report by including the report in the sidelink terminal information.

Alternatively, if it is determined in step S430 that the serving cell is not broadcasting the contents to be reported, the terminal performs the reporting. That is, if it is determined that the serving cell does not know the contents to be reported by the terminal, the steps S430 and S450 may be performed.

On the other hand, in steps S430 and S450, prior to reporting all of the information acquired by the terminal, the terminal transmits a 1-bit flag having small signal size, and thus it can be informed that it has the contents to report and that the base station can request it.

The network may inform the terminal that it supports cooperative scheduling to report the ProSe action of the terminal.

Figure 22:
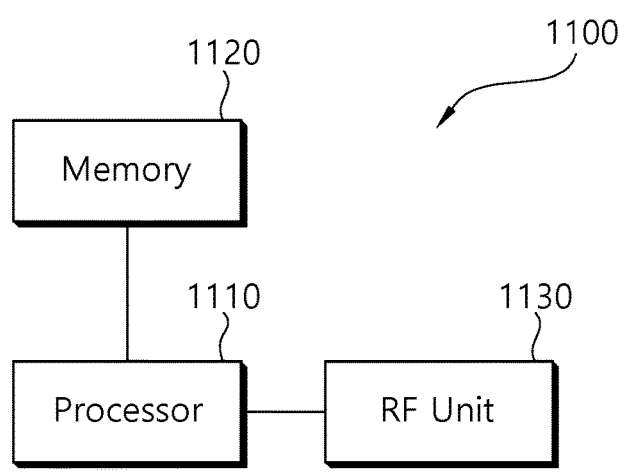
FIG. 22 is a block diagram illustrating a terminal in which an embodiment of the present invention is implemented.

FIG. 22 is a block diagram illustrating a terminal in which an embodiment of the present invention is implemented.

Referring to FIG. 22, a terminal 1100 includes a processor 1110, a memory 1120, and a RF unit (radio frequency unit) 1130. The processor 1110 implements the proposed functionality, process and/or method. The RF unit 1130 is coupled to the processor, and transmits and receives a radio signal.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A method for reporting first information in a wireless communication system, the method performed by a user equipment (UE) and comprising:

receiving, from a serving cell on a first frequency, second information which includes a request to report the first information;

acquiring, from a cell on a second frequency, system information including parameters related to a sidelink discovery procedure;

selecting a target cell on the second frequency;

reporting, to the serving cell, the first information which includes the parameters acquired from the system information and an identifier (ID) of the target cell; and receiving a sidelink configuration related to the target cell from the serving cell, wherein the second frequency is different from the first frequency, wherein the first information is reported within a predetermined time duration, and wherein the UE performs the sidelink discovery procedure on the target cell based on the sidelink configuration.

2. The method of claim 1, wherein the first information is sidelink UE information.

3. The method of claim 1, wherein upon the receiving of the second information, a timer is started.

4. The method of claim 3, wherein the timer stops upon the reporting of the first information.

5. The method of claim 3, wherein when the timer expires, the acquiring of the system information is stopped.

6. The method of claim 1, wherein the first information includes an identity (ID) of a public land mobile network (PLMN) to which the cell on the second frequency belongs.

7. The method of claim 6, wherein the first information further includes a cell ID of the cell on the second frequency.

8. The method of claim 6, wherein the first information further includes information on the second frequency.

9. The method of claim 1, wherein the first information includes at least one of sidelink reception resource information, sidelink transmission resource information, transmission power configuration information, synchronization information, and cell selection or reselection information.

10. The method of claim 1, wherein the system information is system information block (SIB) 19, which includes information on the sidelink discovery procedure.

11. A user equipment (UE) comprising:

a transceiver configured to transmit and receive a radio frequency signal; and a processor operatively coupled to the transceiver, wherein the processor is configured to:

control the transceiver to receive, from a serving cell on a first frequency, second information which includes a request to report first information, acquires, from a cell on a second frequency, system information including parameters related to a sidelink discovery procedure,
selects a target cell on the second frequency,
reports, to the serving cell, the first information which includes the parameters acquired from the system information and an identifier (ID) of the target cell, and
receives a sidelink configuration related to the target cell from the serving cell,
wherein the second frequency is different from the first frequency,
wherein the first information is reported within a predetermined time duration, and
wherein the UE performs the sidelink discovery procedure on the target cell based on the sidelink configuration.

* * * * *